United States Patent [19]

Daubenbüchel et al.

[11] Patent Number: 5,143,681

[45] Date of Patent: * Sep. 1, 1992

[54] EXTRUSION BLOW MOLDING OF MULTILAYER HOLLOW BODIES WITH LAYER DISTURBANCES LIMITED TO FLASH

[75] Inventors: Werner Daubenbüchel, Bergisch-Gladbach; Otto Eiselen, Königswinter; Karsten Friedrichs, Bad Honnef; Erich Kiefer; Peter Klüsener, both of Bonn, all of Fed. Rep. of Germany

[73] Assignee: Krupp Kautex Maschinenbak GmbH, Bonn, Fed. Rep. of Germany

[*] Notice: The portion of the term of this patent subsequent to Aug. 25, 2009 has been disclaimed.

[21] Appl. No.: 670,502

[22] Filed: Mar. 15, 1991

Related U.S. Application Data

[63] Continuation of Ser. No. 410,190, Sep. 20, 1989, abandoned.

[30] Foreign Application Priority Data

Sep. 20, 1988 [DE] Fed. Rep. of Germany ....... 3831836

[51] Int. Cl.$^5$ ..................... B29C 49/04; B29C 49/22; B29C 49/78
[52] U.S. Cl. .................................. 264/515; 425/132; 425/133.1; 425/523
[58] Field of Search ................ 264/515, 173, 40.7; 425/132, 133.1, 523

[56] References Cited

U.S. PATENT DOCUMENTS

| | | |
|---|---|---|
| 3,457,337 | 7/1969 | Turner ........................... 264/98 |
| 3,706,827 | 12/1972 | Nott et al. ..................... 264/176 |
| 3,985,490 | 10/1976 | Kader ............................ 425/381 |
| 4,120,633 | 10/1978 | Feuerherm .................... 425/133.1 |
| 4,149,839 | 4/1979 | Iwawaki ........................ 425/133.1 |
| 4,208,178 | 6/1980 | Przytulla ....................... 425/462 |
| 4,422,838 | 12/1983 | Iwawaki et al. ............... 425/376 A |
| 4,548,569 | 10/1985 | Pitigliano et al. ............. 425/133.1 |
| 4,611,494 | 10/1971 | Feuerherm .................... 425/462 |
| 4,717,326 | 1/1988 | Montonaga et al. ........... 425/133.1 |
| 4,758,144 | 7/1988 | Becker .......................... 425/133.1 |
| 4,867,664 | 9/1989 | Fukuhara ...................... 425/132 |
| 4,874,305 | 10/1989 | McGill et al. ................. 425/131.1 |
| 4,937,035 | 6/1990 | Richter ......................... 264/515 |
| 4,978,290 | 12/1990 | Fukuhara ...................... 425/147 |
| 5,004,578 | 4/1991 | Eiselen ......................... 264/514 |

FOREIGN PATENT DOCUMENTS

| | | |
|---|---|---|
| 0249866 | 6/1987 | European Pat. Off. . |
| 2161356 | 12/1971 | Fed. Rep. of Germany . |
| 2050563 | 4/1972 | Fed. Rep. of Germany . |
| 2712910 | 9/1978 | Fed. Rep. of Germany . |
| 3026822 | 1/1982 | Fed. Rep. of Germany . |
| 3439285 | 8/1985 | Fed. Rep. of Germany . |
| 3623308 | 1/1988 | Fed. Rep. of Germany . |
| 2299957 | 9/1976 | France . |
| 2354188 | 1/1978 | France . |
| 39448 | 11/1980 | Japan ........................... 264/173 |
| 56-33928 | 4/1981 | Japan . |
| 60-187513 | 2/1986 | Japan . |
| 61-158409 | 7/1986 | Japan ........................... 264/515 |
| 61-171320 | 8/1986 | Japan . |
| 8802689 | 4/1988 | World Int. Prop. O. . |

*Primary Examiner*—Jan H. Silbaugh
*Assistant Examiner*—Catherine Timm
*Attorney, Agent, or Firm*—Panitch Schwarze Jacobs & Nadel

[57] ABSTRACT

In a process and apparatus for the discontinuous production of preforms for producing hollow bodies from thermoplastic material, the wall of which is a laminate having at least first and second layers, by extrusion blow molding, the flow of material for forming the laminate is guided within the extrusion head which serves to produce the preforms, by suitable dimensioning of the volume of the duct system accommodating the laminate, such that regions of disturbed laminate occur in the end portions of the preform which are squeezed off the extruded preform by the blow molding mold as a waste portion.

34 Claims, 11 Drawing Sheets

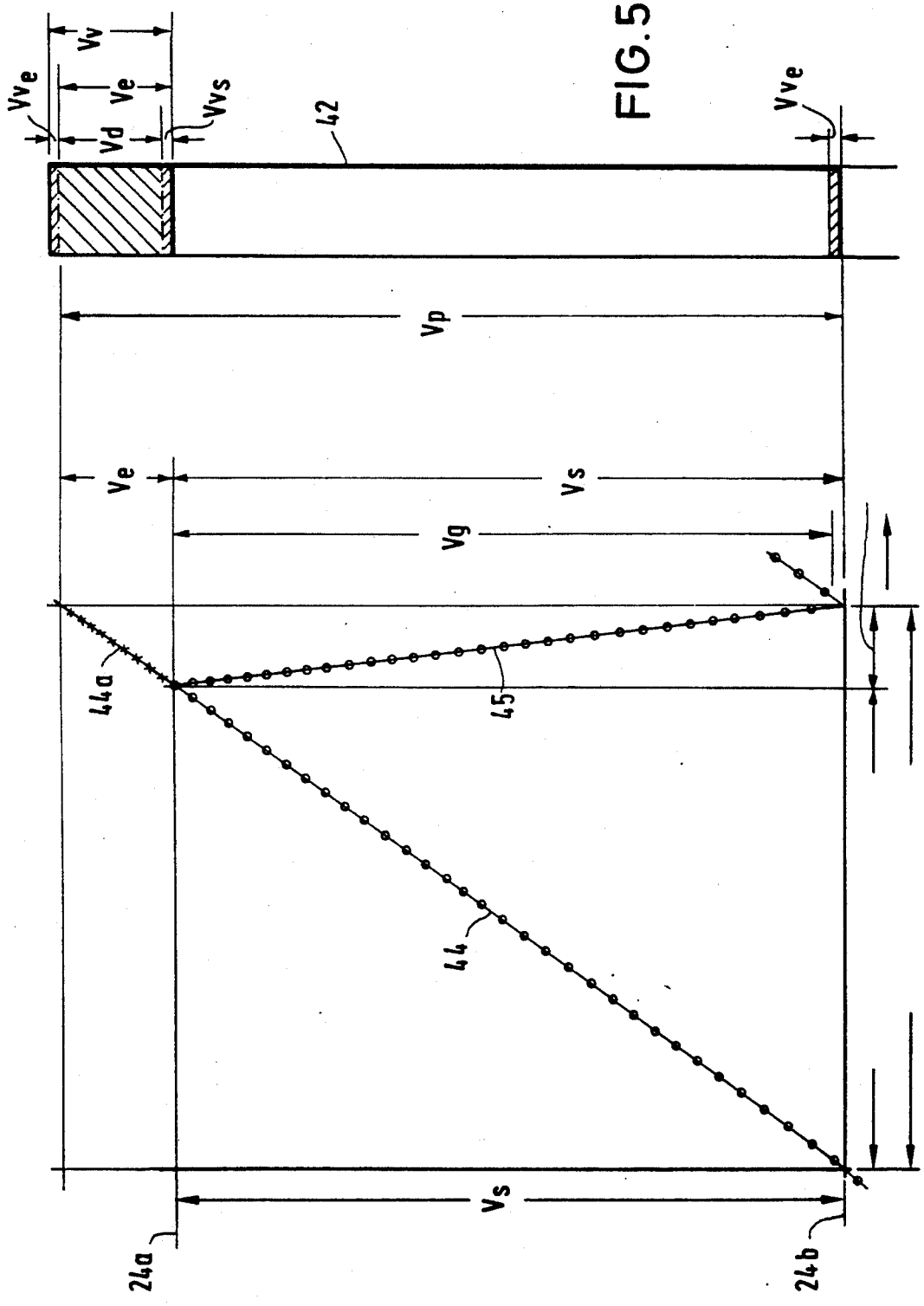

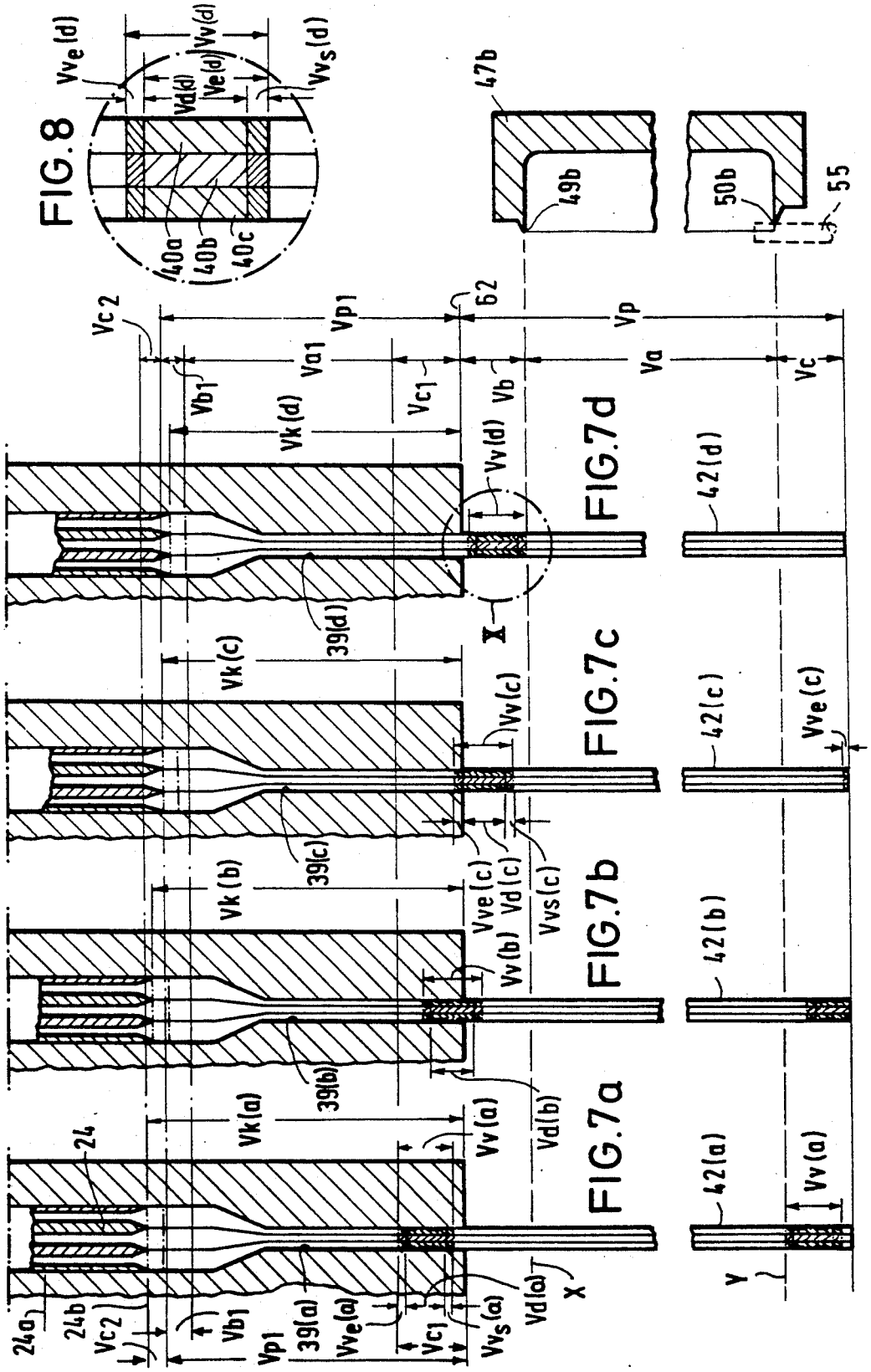

EXTRUSION BLOW MOLDING OF MULTILAYER HOLLOW BODIES WITH LAYER DISTURBANCES LIMITED TO FLASH

This application is a continuation of U.S. patent application Ser. No. 410,190 filed Sep. 20, 1989, now abandoned.

BACKGROUND OF THE INVENTION

The present invention relates generally to a process and an apparatus for the production of hollow bodies from thermoplastic material, the wall of which comprises a laminate formed by at least first and second layers, by means of extrusion blow molding.

In a process for the production of a hollow body from thermoplastic material with a wall in the form of a laminate structure comprising at least first and second layers, preforms are first produced in a batch-wise manner, the wall of each preform having a suitable number of layers, bu using an extrusion unit comprising at least first and second continuously operating extruders and a common extrusion head. The extrusion unit is provided with a storage chamber for storage of the materials which are plasticised in the extruders, together with means for emptying the storage chamber to form preforms, said means being movable with a stroke-like movement between first and second limit positions. Flows of material from the storage chambers, the number thereof corresponding to the number of layers forming the wall of the hollow body, are brought together in the region of the extrusion head in such a way that mutually adjoining flows of materials are joined together in a laminate-formation area to provide a laminate for constituting the wall of the preform. The laminate is advanced through a communicating duct within the extrusion head to an outlet opening disposed at a spacing from the storage chamber. A given portion by volume of the laminate is then ejected through the outlet opening to form the preform which has two end portions and a central portion, at least a part of the central portion being expanded within the mold cavity of a split blow molding mold under an increased internal pressure therein, while the end portions of the overall portion of material forming the preform are squeezed off the preform, as constituting excess material, by means of a squeezing-off operation in which parts of the blowing mold are involved, the excess material remaining outside the mold cavity of the mold.

In an operating procedure which is similar to that outlined above, as disclosed in German laid-open application (DE-OS) No 36 35 334, the individual flows of material are firstly put into an annular configuration in cross-section, within an annular piston forming part of the extrusion head, and the flows of material are then brought together within the annular piston to form the laminate. The laminate is passed through an annular duct into the storage chamber so that the plastic materials for producing the preform are already stored in laminate form. Thus, in the subsequent emptying stroke movement for emptying the material from the storage chamber, which is performed by the annular piston, the laminate which has already been formed therein is displaced towards the outlet opening.

In another operating procedure as disclosed in German laid-open application (DE-OS) No 36 20 144 (corresponding to U.S. Pat. No. 4,758,144), use is made of an extrusion head in which the flows of material from the extruders are passed through annular ducts disposed in a stationary component of the extrusion head, to a laminate-formation region rom which the laminate produced from the flows of material is passed through an annular duct into the storage chamber which can then be emptied by an annular piston unit forming part of the extrusion head.

The fact that the preform is produced in a batch-wise manner in dependence on the stroke movements of the annular piston for emptying the storage chamber in the above-discussed apparatuses means that a distinction can be made between two operating phases within the extrusion head. After conclusion of the production of a preform by the ejection of a suitable amount of laminate structure through the outlet opening of the extrusion had, the storage chamber is emptied. In that situation, the annular piston takes up its limit position at the end of the emptying operation. In the subsequent phase in operation of the apparatus, the storage chamber is filled with laminate, the layers of which are conveyed into the extrusion head by the associated extruders which perform a material plasticising operation. In that case the annular piston which is used for emptying the storage chamber is thus moved back into its second limit position which corresponds to the end of the storage chamber-filling operation. During that phase of operation, no preform is ejected from the extrusion head so that the material in laminate form which is to be found in the duct system between the storage chamber and the outlet opening is also not moved. After the operation of filling the storage chamber with material has been concluded, there then follows the other phase of operation in which the previously formed laminate, for producing a preform, is ejected from the storage chamber under the effect of the annular piston and displaced towards the outlet opening. When that happens, the laminate flows through a communicating duct towards the outlet opening. During that second phase of operation, the ejection operation which forms the preform is predominantly effected by virtue of displacement of the material out of the storage chamber by means of the annular piston. However also added thereto is a minor portion of material which, when the extruder units are operating continuously, is conveyed thereby into the extrusion head during the ejection stroke movement of the piston, with the consequence that as a result a certain proportion of material is additionally urged towards the outlet opening, in addition to the material which is displaced by the annular piston. It will be appreciated that it is desirable for the extruders which are operable to plasticise the material for forming the respective layers of the laminate structure operate in an uninterrupted fashion in order that the operating conditions at the laminate-formation region within the apparatus can be stabilised. That is necessary in order for the individual layers of the laminate structure to be of the respectively desired thicknesses, thereby making it possible to maintain the proper distribution of thicknesses of the respective layers within the laminate structure.

The batch-wise and thus discontinuous production of preforms results in different operating conditions, corresponding to the different phases of operation, in particular in regard to the pressure conditions which obtain in the extrusion head. The different and accordingly varying pressure conditions mean that, at the beginning and possibly also at the end of each emptying stroke movement, and also at the beginning of each filling stroke movement, different pressure conditions obtain in the laminate-formation region of the apparatus, in regard to the individual flows of material which go to make up the laminate structure. The varying pressure conditions can result in irregularities in the formation of the laminate structure. That is to be attributed for example to the fact that the volumes of the individual layers of the laminate structure and therewith the volumes of the individual duct systems through which the flows of material, while still separate, flow to the laminate-formation region in the apparatus, are normally different. As thermoplastic materials, in the plastic condition, do not behave like a liquid but within certain limits have a certain degree of resilient compressibility which, when the pressure is relieved, results in a return movement, that is to say an increase in the volume of the plastic material, it will be noted that at the beginning and possibly also at the end of each emptying stroke movement and possibly also at the beginning of each filling stroke movement, the individual flows of material which make up the laminate structure experience deformation effects in the region of the apparatus in which the laminate structure is formed, due to differences in compression and decompression effects in respect of the flows of material. Such deformation of the flows of material will result in the laminate structure being of an irregular nature, in particular in regard to the spatial and quantitative distribution of the individual layers in the laminate structure. Those irregularities remain limited to the first phase of the emptying stroke movement as, after the beginning of the emptying stroke movement, a condition of equilibrium occurs in the system. A similar aspect may also apply in regard to the terminal phase of the emptying stroke movement and in regard to the initial phase of the filling stroke movement. Those two phases possibly blend into each other in such a way that the pressure-relief effect begins just shortly prior to the conclusion of the emptying stroke movement, so that a condition of equilibrium in respect of the pressures involved will be restored again only after the beginning of the filling stroke movement. At any event the pressure-relief effect can result in decompression of the material which will differ from one flow of material to another, by virtue of the differences in volume and properties of the materials forming the individual flows, whereby irregularities in the distribution of the individual layers in the laminate structure may occur in the region of the laminate-formation region. Those irregularities do not occur at least in that manner when the preforms are extruded continuously as that procedure does not involve any variations in the pressure conditions, as are caused by batch-wise formation of the preforms.

The above-discussed irregularities can result in serious reductions in the level of quality of the hollow bodies to be produced from the preforms, by virtue of the fact that the walls thereof are of an irregular nature. In that connection the way in which the flows of material are guided in the extrusion head prior to the step of forming the laminate therefrom is immaterial as the variations in pressure conditions, which give rise to such irregularities, do occur at any event due to the change between filling and emptying, which is typical in respect of batch-wise production of the preforms.

SUMMARY OF THE INVENTION

An object of the invention is to provide a process for the production of a hollow body from thermoplastic material by extrusion blow molding, which does not seriously suffer from disadvantages of the above-discussed processes.

Another object of the invention is to provide a process for producing hollow bodies from thermoplastic material by extrusion blow molding in such a way that the quality of the hollow bodies which are produced from preforms is not adversely affected to a serious degree by conditions obtaining in the equipment for carrying out the process.

Yet another object of the invention is to provide for the production of preforms for producing hollow bodies by extrusion blow molding, which is such that it is capable of producing hollow bides in large numbers, using simple means, without irregularities in the preforms such as to have an adverse effect on the quality of the end product.

Still another object of the invention is to provide a process for producing preforms to make hollow bodies, wherein irregularities in the laminate structure of the preform, caused by the operating conditions of the apparatus for carrying out the process, do not have an adverse effect on the quality of the end product.

Still a further object of the invention is to provide an apparatus for producing hollow bodies by extrusion blow molding, which is capable of producing preforms for making the hollow bodies, which are at least substantially free from irregularities in the preform structure which could have an adverse effect on the quality of the end product.

In accordance with the present invention, these and other objects are attained by a process for the production of hollow bodies from thermoplastic material, the wall of which comprises a laminate structure having at least first and second layers, by means of extrusion blow molding, wherein preforms which comprise a wall having a corresponding number of layers are first produced in a batch-wise procedure using an extrusion unit having at least first and second continuously operating extruders and a common extrusion head. The extrusion unit has a storage chamber for storage of materials which are plasticised in the extruders, and means for emptying the storage chamber to form a preform, said means being reciprocatingly movable with a stroke-like movement between first and second limit positions. Flows of material, the number of which corresponds to the number of layers in the wall structure of the hollow body, are brought together in the region of the extrusion head in such a way that mutually adjacent flows are combined together to form a laminate structure for providing the wall of the preform, in a laminate-formation region. The laminate structure is advanced through a communicating duct within the extrusion head to an outlet opening disposed at a spacing from the storage chamber. An overall portion of the laminate structure, for forming the preform, is ejected from the outlet opening. That preform-forming portion comprises first and second end portions and a central portion, at least a part of the central portion being expanded within the cavity of a split blowing mold under the effect of an increased internal pressure, while the end portions of the preform-forming portion are squeezed off the body of the preform, as excess material, by a squeezing-off operation in which parts of the flowing mold are involved. The excess material remains outside the mold cavity. The laminate is stored in the storage chamber after the formation thereof and the volume of the communicating duct between the laminate-formation region and the outlet opening, at the moment at which the means for emptying the storage chamber take up their position at the end of the emptying stroke movement thereof, is of such a size that, with a predetermined volume in respect of the overall portion of material for forming the preform, the material, after leaving the storage chamber, still remains in the extrusion head for a period corresponding to the duration of at least one working cycle, and a portion of at least partially disturbed laminate which occurs at the end of the emptying stroke movement and/or at the beginning of the filling stroke movement and at the beginning of the emptying stroke movement of the means for emptying the laminate structure from the storage chamber, adjacent the laminate-formation region, and inclusive of the material which is extruded into the storage chamber during the emptying stroke movement of the means for emptying the chamber, is disposed in at least one of the end portions which are squeezed off the portion of material forming the extruded preform, and remain outside the mold cavity of the blowing mold when at least a part of the central portion of the preform-forming portion is expanded in the mold cavity.

As will be seen in greater detail hereinafter, the above-outlined process in accordance with the present invention has the advantage that in most cases at least there is no need for additional expenditure in respect of plastic material in order to achieve the desired effect. When using extrusion blow molding processes, it is in any case necessary to employ a preform which is longer than the hollow body that is to be produced therefrom. The excess material is generally squeezed off the preform when the split blowing mold is closed around the preform, by means of the blowing mold being provided with squeezing-off edges for that particular purpose and/or by virtue of the co-operation between the blowing mold and a blowing mandrel member, so that both ends of the hollow body carry portions of waste or excess material, forming what is often referred to as 'flash', which generally remain connected to the hollow body by way of a thin web portion which can be severed to remove same. The flash portions at the two ends of the hollow body are of a certain minimum length, due to the operating procedures involved in the process, so that the portion of the preform which suffers from the irregularities caused by the production procedures can be caused to occur in at least one of the flash portions, even when the laminate portion which has a disturbed structure and/or a laminate portion which is undisturbed in its structure but which occurs between two adjacent laminate portions of disturbed structure and which must also be caused to lie in at least one of the flash portions, are of an axial extent which is not extremely short.

The procedure involved is desirably such that the volume of the communicating duct between the laminate-formation region and the outlet opening at the moment at which the means for emptying the storage chamber occupy their position at the end of the emptying stroke movement:

a) is not less than the sum of the volume formed by the volume of the central portion of the preform and the volume of the end portion which leads in the direction of flow of the material and the portion which is conveyed into the extrusion head from the extruders during the emptying stroke movement, and b) is not greater than the sum of the volume made up by the volume of the overall portion which constitutes a perform, and the volume of the end portion of the preform which leads in the direction of flow of the material, less the volume of the portion of disturbed laminate which occurs at the beginning of the filling stroke movement, wherein c) the sum of the volumes of the portion which is conveyed into the extrusion head from the extruders during the emptying stroke movement and the portion of disturbed laminate which is produced at the beginning of the filling stroke movement is not greater than the sum of the volumes of the two end portions of the overall portion constituting a preform.

In that connection the procedure can be such that the volume of the communicating duct between the laminate-formation region and the outlet opening, at the time at which the means for emptying the storage chamber occupy their position at the end of the emptying stroke movement, is such that it is equal to the volume of a preform.

It is also possible for the volume of the communicating duct between the laminate-formation region and the outlet opening of the extrusion head to be such, at the moment at which the means for emptying the storage chamber occupy their position at the end of the emptying stroke movement, that it complies with the conditions set forth above in paragraphs a) and b), plus the volume of an overall portion constituting a preform, or an integral multiple of the volume for a perform. An operating procedure which has found to be particularly advantageous is one in which the total portion of material which has disturbed regions of laminate structure, possibly including portions of undisturbed regions of laminate structure, possibly including portions of undisturbed structure which are disposed between disturbed regions of laminate structure, is distributed between two adjacent end portions of two successively ejected preforms in such a way that the one portion which involves disturbed regions of laminate structure is disposed in the end portion at one end of a preform and the second portion which has disturbed areas of laminate structure occurs in the end portion at the corresponding other end of the preform produced in the following working cycle. However it is also possible to adopt a mode of operation in which the total portion of at least partially disturbed laminate occurs only in one end portion of a respective preform.

In accordance with another preferred feature of the invention the materials for the layers for forming the laminate structure flow into the storage chamber, while the laminate-formation region reciprocates during the filling stroke movement and during the emptying stroke movement within the extrusion head, with a motion corresponding to the movements of the means for emptying the storage chamber. When the materials for the layers for forming the laminate are supplied in a different fashion, the laminate-formation region may also be stationary instead of moving in the above-indicated manner.

In another aspect of the invention, there is provided an apparatus for producing hollow bodies from thermoplastic material, the wall of which comprises a laminate having at least first and second layers, by extrusion blow molding, comprising an extrusion head having at least first and second extruders and a common extrusion head with an annular outlet opening. The extrusion unit is provided with a storage chamber for storage of the material which is plasticised in the extruders, and means which are reciprocatable with a stroke-like movement between first and second limit positions, for emptying the storage chamber, thereby to form a preform. The apparatus further comprises at least one split blow molding mold provided with squeezing-off edges and having at least one mold cavity, within which at least a part of the central portion of the preform is expanded under an increased internal pressure to provide a respective hollow body, and an end portion of the preform is squeezed off, at both ends of the central portion of the preform, constituting excess material or flash. Provided within the extrusion head is at least one laminate-formation region in which the flows of material for constituting the individual layers to form the laminate structure are joined together, and the laminate-formation region is connected to the outlet opening by way of a communicating duct through which the laminate flows towards the outlet opening. The volume of the communicating duct between the region in which the laminate is formed, the laminate being stored in the storage chamber after it has been formed, and the outlet opening at the moment at which the means for emptying the storage chamber occupy their position at the end of the emptying stroke movement is such that with a predetermined volume in respect of the overall portion of material for forming a preform, the material, after leaving the storage chamber, still remains in the extrusion head for a period corresponding to the duration of at least one working cycle, and a portion of at least partially disturbed laminate structure which occurs at the end of the emptying stroke movement and/or at the beginning of the filling stroke movement and at the beginning of the emptying stroke movement of the means for emptying the storage chamber, adjacent the laminate-formation region, including the material which is extruded into the extrusion head during the emptying stroke movement, is positioned in at least one of the end portions which are squeezed off the overall portion which constitutes the extruded preform and are positioned outside the mold cavity when at least a part of the central portion of the preform is expanded in the mold cavity.

It has been found particularly advantageous, in accordance with a preferred feature of the invention, for the volume of the communicating duct between the laminate-formation region and the outlet opening at the moment at which the means for emptying the storage chamber occupy their position at the end of the emptying stroke movement thereof to be so selected as to satisfy the following conditions:

$$Vk \geq n \cdot Vp - Vb + Ve \text{ and}$$

$$Vk \leq n \cdot Vp + Vc - Vve$$

wherein n is 1 or an integral multiple of 1,

Vp represents the overall portion by volume for constituting a respective preform, Vb represents the end portion of a preform to be squeezed off, being the trailing end in the direction of flow of the laminate structure, Vc represents the end portion of a preform, which is to be squeezed off, being the leading end in the direction of flow of the laminate structure, Ve represents the proportion of material by volume which, during the operation of emptying of the storage chamber, with the extruders operating continuously, is conveyed by the extruders into the extrusion head, and Vve represents the portion of disturbed laminate, which is the trailing portion as considered in the direction of flow of the laminate structure and which is formed after the beginning of the filling stroke movement, with the additional condition that:

$$Vv = Ve + Vve \leq Vb + Vc.$$

If the above-indicated conditions are met, that ensure at any event that the regions of disturbed laminate do not occur in the central portion of the material for forming the respective preform and from which the hollow body is to be formed as the finished product.

So that the apparatus can be used without major difficulty for the production of different hollow bodies, it is further proposed in accordance with a preferred feature of the invention that the volume of the communicating duct can be steplessly varied within a given range. A variation in volume will generally be necessary when the weight of the hollow body to be produced has to be altered or the extrusion unit has to be converted from the production of one kind of hollow body to another. The volume of the communicating duct can be adapted to the respective volume required in respect of the preform in a simple manner by the means for emptying the storage chamber being in the form of at least one annular piston and the position of the stroke movements performed by the annular piston for filling and emptying the storage chamber relative to the outlet opening is such that the volume of the communicating duct satisfies the above-indicated conditions.

Further objects, features and advantages of the present invention will be apparent from the following description of preferred embodiments thereof.

BRIEF DESCRIPTION OF THE DRAWINGS

FIG. 5 is a graph representing a working cycle and a preform produced therein, FIGS. 7a–d are diagrammatic representations of the positioning of the regions of disturbed laminate structure in a preform in dependence on the volume of the communicating duct, in the extrusion head, FIG. 8 shows a portion from FIG. 7d on an enlarged scale, illustrating the structure of a given part of the preform, FIGS. 9a and 9b each show a view corresponding to that shown in FIG. 4a, of two embodiments with communicating ducts of different volumes.

DESCRIPTION OF PREFERRED EMBODIMENTS

Figure 1:
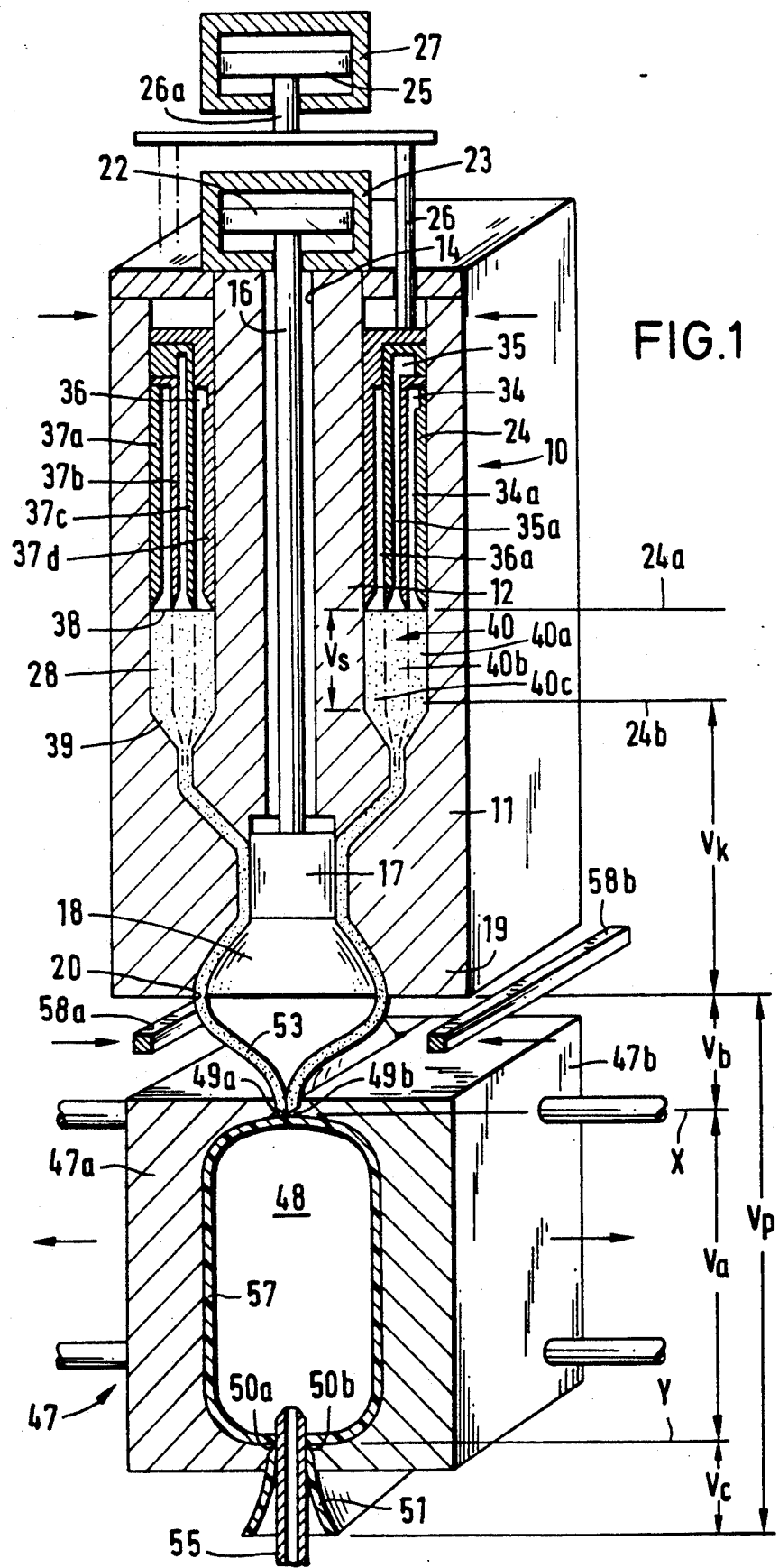
FIG. 1 is a perspective view in longitudinal section through an extrusion head with a blow molding mold disposed therebeneath.

Referring to FIGS. 1 through 9 of the accompanying drawing, the apparatus illustrated therein is designed for the production of hollow bodies, the wall of which comprises a laminate structure formed by at least first and second layers of thermoplastic material. Accordingly, an extrusion head 10 comprises a housing 11, within which a core 12 is arranged in coaxial relationship with the housing 11 and at a spacing from the inside surface of the housing 11. The core 12 has an axial bore 14 extending therethrough. The bore 14 serves to accommodate a rod or bar 16 which is capable of reciprocating movement in the longitudinal direction of the extrusion head 10 and which at its one end, being the lower end as illustrated for example in FIG. 1, carries a guide member 17. Mounted on the guide member 17 is a nozzle core 18 which, jointly with the region 19 of the housing 11 surrounding the nozzle core 18, delimits an outlet opening 20. The rod 16 is connected to a piston 22 of a hydraulic piston cylinder assembly 23, at the end of the rod 16 remote from the outlet opening 20. Suitable actuation of the piston 22 means that the nozzle core 18 can be moved axially upwardly and downwardly, thereby to vary the width of the annular extrusion or outlet opening 20. That is achieved in the usual manner in that the mutually oppositely disposed surfaces of the nozzle core 18 and the parts of the housing 19 disposed therearound extend in a tapered configuration, as can be clearly seen from FIG. 1. The parts of the housing 19 which are disposed around the nozzle core 18 and which thus co-operate therewith to define the outlet opening 20 may be in the form of a separate nozzle ring member which is fitted into the body of the housing 19.

Provided within the extrusion head 10 is a storage or accumulator chamber 28 which is of annular cross-section and which is disposed coaxially with respect to the core 12. Associated with the storage chamber 28 is an axially reciprocatable annular piston 24. At its end remote from the outlet opening 20 the annular piston 24 is connected by way of piston rods 26 and 26a to a piston 25 which is guided in a cylinder 27, thereby forming a piston-cylinder assembly. It is also possible for the apparatus to comprise a plurality of piston-cylinder assemblies 25 and 27.

The extrusion head as described above is connected to first, second and third extruders (not shown), each of which conveys a respective thermoplastic material or other material having substantially the same properties in regard to workability, into the extrusion head 10. The extruders are suitably connected to duct systems within the annular piston 24. The communication between the extruders and the extrusion head may be made in any appropriate fashion and is therefore not part of the subject-mater of the present invention so that it will not be described in greater detail herein. For example, the connection between the outlet openings of the respective extruders and the duct systems within the annular piston 24 may be made in the manner described in German laid-open application (DE-OS) No 36 35 334 while other possible forms of such a connection are described for example in German published application (DE-AS) No 21 61 356 or German patent specifications Nos 26 39 665 and 30 26 882, to which reference is accordingly hereby directed as incorporating the disclosure thereof.

Each of the flows of materials from the respective extruders passes within the piston 24 into a respective annular distributor duct 34, 35 and 36, each of which extends around the extrusion head in a plane normal to the longitudinal axis thereof. For reasons of space, the distributor ducts 34, 35 and 36 may be arranged in somewhat displaced relationship relative to each other, within the annular piston 24, in the direction of the longitudinal axis thereof. In the distributor duct 34, 35 and 36 the flow of material supplied by the respective extruder in the form of a continuous elongate portion is converted into a flow of material which is of annular cross-section.

Connected to each of the distributor ducts 34, 35 and 36 is a respective annular duct 34a, 35a and 36a. The annular ducts 34a, 35a and 36a open at the lower end 38 of the annular piston 24 into the storage chamber 28 or, when the annular piston 24 is in its bottom limit position as indicated at 24b, into the communicating duct 39 which is connected to the storage chamber 28 and which connects the storage chamber 28 to the annular outlet opening 20 of the extrusion head. For the sake of simplicity reference will merely be made hereinafter to the point that the annular ducts 34a, 35a and 36a open into the storage chamber 28 as that is the case in all positions of the annular piston 24, with the exception of the limit position in which it is towards the outlet opening 20.

The end portions of the annular ducts 334a, 35a and 36a, which are towards the outlet opening 20, are of a taperingly enlarging configuration in the direction of flow of the plastic material which flows through the individual duct systems. The separating walls 37a, 37b, 37c and 37d which define the annular ducts 34a, 35a and 36a in the annular piston 24 correspondingly decrease in thickness in the above-indicated direction of flow, as can be clearly seen from FIG. 1. That serves on the one hand to reduce the rate of the individual flows of material in the conically enlarging end portions of the annular ducts. On the other hand, in that way the individual flows of material from the extruders are already moved towards each other as they flow through the enlarging end portions so that they combine within the storage chamber 28 to form the laminate, immediately after passing the end face 38 of the annular piston 24 which is essentially defined by the respective ends of the wall portions 37a, 37b, 37c and 37d defining the individual annular ducts 34a, 35a, 36a.

Accordingly the laminate-formation region is directly adjoining the free end face 38 of the annular piston 24 which, when the storage chamber 28 is filled with the laminate material issuing from the duct systems, is displaced upwardly under the effect of the pressure applied thereto by the laminate material, until the piston 24 has reached its upper limit position as indicated at 24a in FIG. 1. In that connection it may be desirable for the outlet opening 20 to be closed during that filling stroke movement of the annular piston 24, although that is not always necessary as in many cases the resistance that the annular piston 24 affords, with its drive means in the form of the piston-cylinder assembly or assemblies 25 and 27, to the laminate material filling the storage chamber 28, can be less than the flow resistance in the duct 39 communicating the storage chamber 28 with the outlet opening 20, and also in the outlet opening 20 itself.

As, by virtue of the above-described configuration of the extrusion head 10 and in particular the free end of the annular piston 24, the individual flows of material leaving the annular ducts 34a, 35a and 36a, at the moment of issuing from those ducts, fill the entire width, that is to say the radial extent, of the storage chamber 28, the individual flows of material, at the moment at which the laminate structure is formed therefrom by the flows becoming joined together, perform only minor transverse movements in order thereby to come into contact with each other to combine to form the laminate structure. That is advantageous in regard to the degree of uniformity in the operation of formation of the laminate 40, and thus the uniformity of the resulting laminate 40, especially as, after it has been formed, the laminate 40 remains substantially immobile within the storage chamber 28.

As soon as the annular piston 24, at the end of the phase involving filling the storage chamber 28 with material, has reached its upper limit position as indicated at 24a in FIG. 1, in which the storage chamber 28 is thus filled with the laminate material 40, the annular piston 24 is moved towards the extrusion outlet opening 20 by actuation of the piston-cylinder assembly 25 and 27. In the course of that stroke movement of the piston, the laminate material 40 stored in the storage chamber 28 is simultaneously displaced towards the outlet opening 20 until the annular piston 24 has reached its lower limit position indicated at 24b in FIG. 1 and illustrated in FIGS. 2 and 3.

After that emptying stroke movement, in the course of which the material in the storage chamber 28 is discharged therefrom, the material issuing from the outlet openings of the annular ducts 34a, 35a and 36a displaces the annular piston 24 upwardly again into its limit position indicated at 24a in FIG. 1, with the storage chamber 28 being filled with laminate material at the same time. In particular FIG. 1 shows that at its top end the storage chamber 28 is delimited by the end 38 of the annular piston 24 in its limit position 24a.

As the extruders (not shown) operate continuously, material is also conveyed into the extrusion head 10 during the emptying stroke movement of the annular piston 24. That means that the volume Vs of the material stored in the storage chamber 28 is less than the volume Vp of the preform to be produced. The difference between the volume Vs of the storage chamber 28 and the volume Vp of the preform corresponds to the volume Ve of material which is conveyed into the extrusion head 10 by the extruders during the emptying stroke movement of the annular piston 24. Another consequence of the extruders continuously extruding material into the extrusion head is that the material in the storage chamber 28 is urged towards the outlet opening 20 during the emptying stroke movement of the annular piston 24, not only by the annular piston 24 itself but also by the material which is passed into the extrusion head 10 by the extruders during the emptying stroke movement.

To explain that situation in greater detail, reference will now be made to FIGS. 4a through 4d which are diagrammatic views of a part of the extrusion head 10, illustrating the annular piston 24 in four different positions.

The working cycle begins with the annular piston 24 in its lower limit position 24b in which it is towards the outlet opening 20 and in which the storage chamber 28 is totally emptied. That corresponds to the condition shown in FIG. 4a. In that position the end face 38 of the annular piston 24 extends in the plane indicated at 24b which also represents the boundary of the storage chamber 28 which is towards the outlet opening 20.

Flows of material which pass into the storage chamber 28 from the respective extruders cause the annular piston 24 to be displaced upwardly in the above-described manner into its limit position 24a in which it is remote from the outlet opening 20 of the extrusion head 10, with the storage chamber 28 being filled with laminate material 40 at the same time.

Figures 4A, 4B, 4C, 4D:
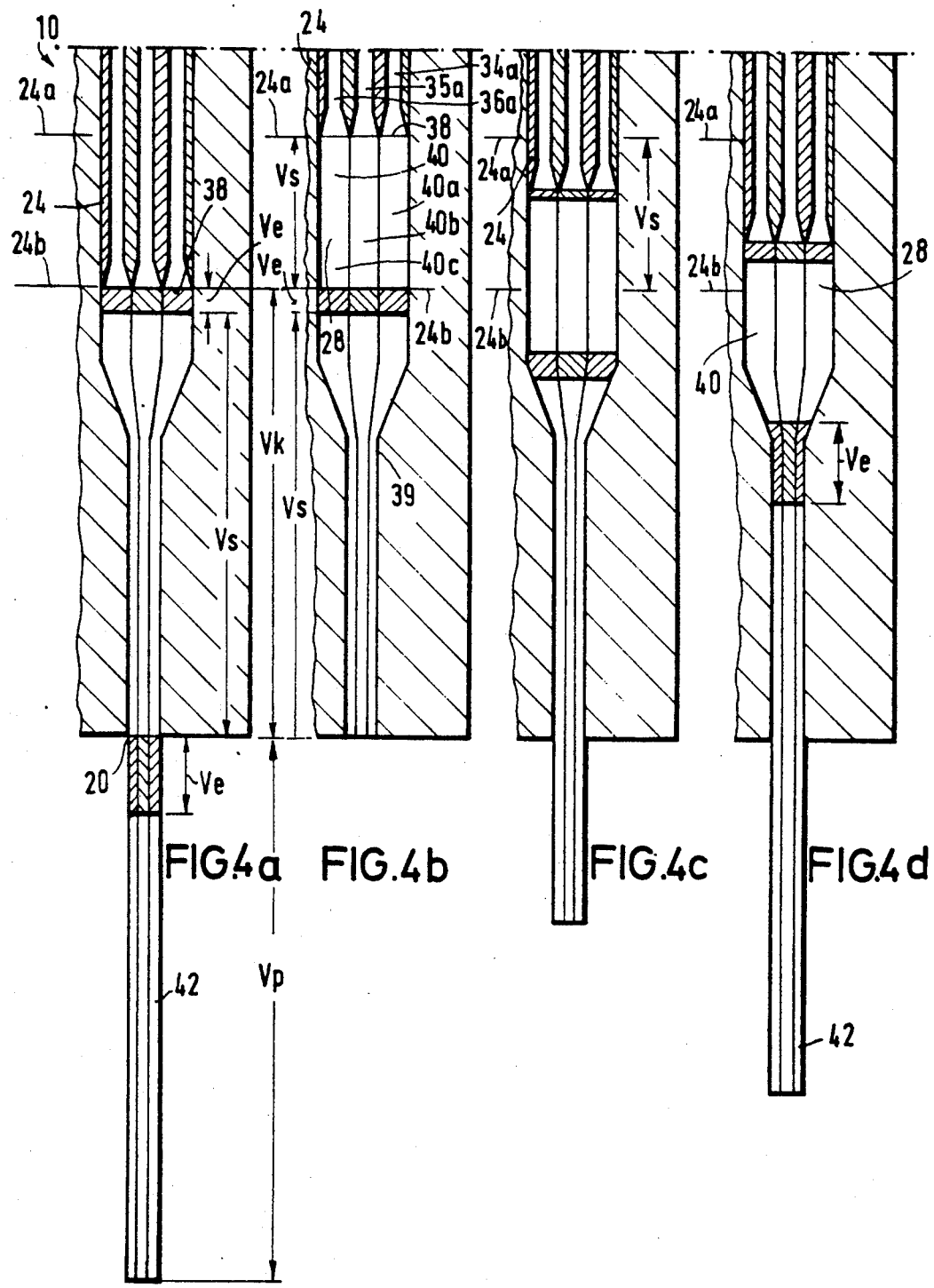

As soon as the annular piston 24 has reached its upper limit position 24a as illustrated in FIG. 4b and in which its end face 38 defines the upper boundary of the storage chamber 28, and thus the storage chamber 28 is completely filled, the annular piston 24 is moved towards its lower limit position 24b again by suitable actuation of the piston 25 in the cylinder 27, while at the same time the laminate 40 which is in the storage chamber 28 and in the communicating duct 39 is simultaneously displaced towards the outlet opening 20.

During the emptying stroke movement of the annular piston 24, materials continue to be conveyed into the storage chamber 28 through the annular ducts 34a, 35a and 36a, by virtue of the extruders continuing to operate. FIG. 4c shows the annular piston 24 in an intermediate position, just after the beginning of the emptying stroke movement of the piston. The material which is additionally extruded into the storage chamber 28 through the annular ducts 34a, 35a and 36a during the emptying stroke movement of the annular piston 24 forms a laminate portion which is indicated by hatching at Ve in FIGS. 4a through d. FIGS. 4c and d show that that portion of material becomes progressively larger in terms of its axial dimension in the course of the emptying stroke movement of the annular piston 24, until, at the end of that movement when the piston 24 has reached its lower limit position as shown in FIG. 4a, the additionally extruded portion Ve is at its largest size. As the laminate-formation region of the extrusion apparatus is directly beneath the lower boundary face 38 of the annular piston 24, the laminate-formation region moves synchronously with the movements of the annular piston 24, that is to say towards the outlet opening 20 during the emptying stroke movement of the piston and away from the outlet opening 20 during the filling operation.

Accordingly the laminate structure 40 which is displaced towards the outlet opening 20 from the storage chamber 28 during the emptying stroke movement of the piston 24 comprises two portions by volume, namely a portion as indicated at Vs for example in FIG. 4b, which results from the material that was stored in the storage chamber 28, and a smaller portion Ve which was added by being extruded through the annular piston 24 during the emptying stroke movement thereof.

Figure 2:
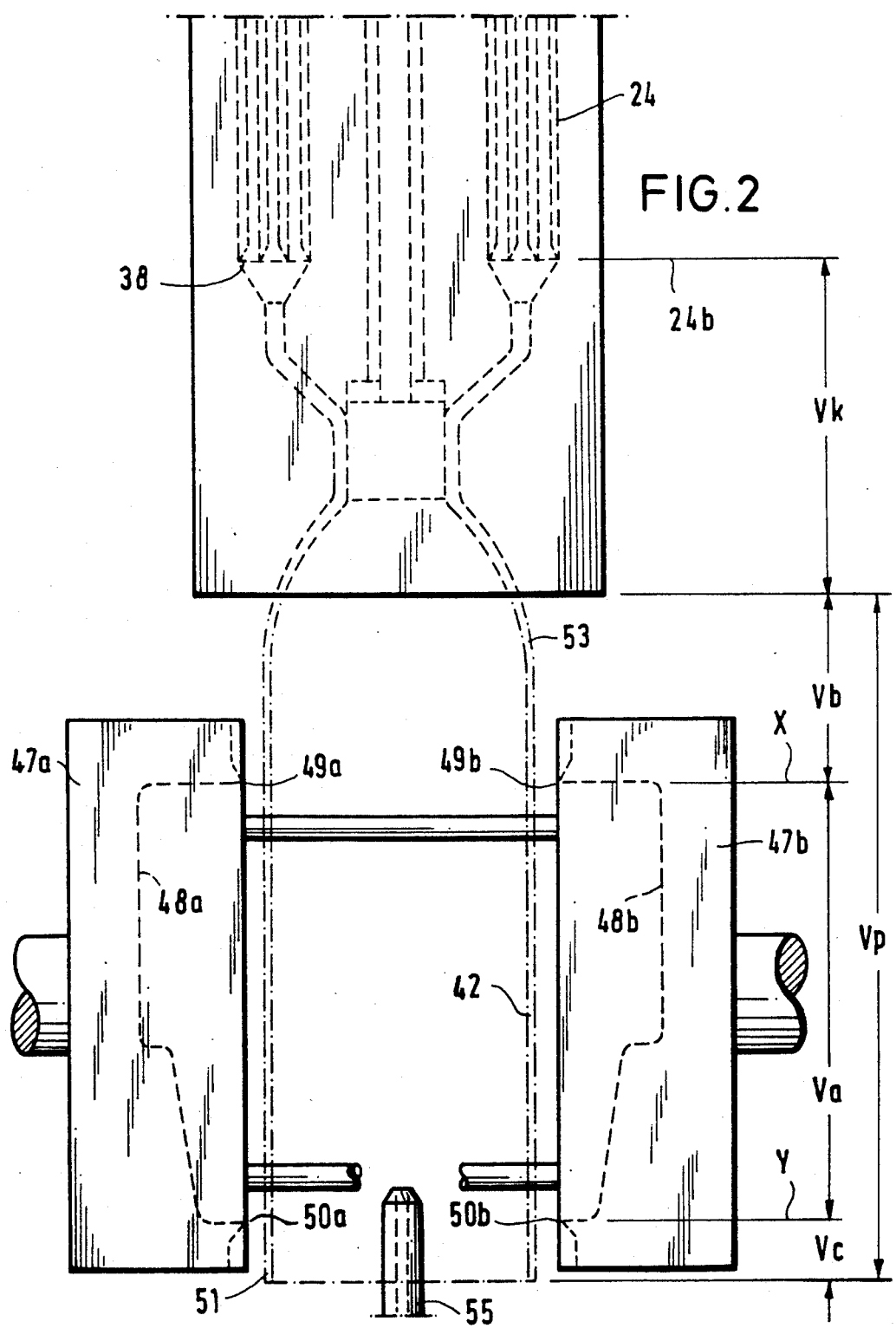
FIG. 2 is a view corresponding to that shown in FIG. 1, illustrating the mold in an open position.
Figure 3:
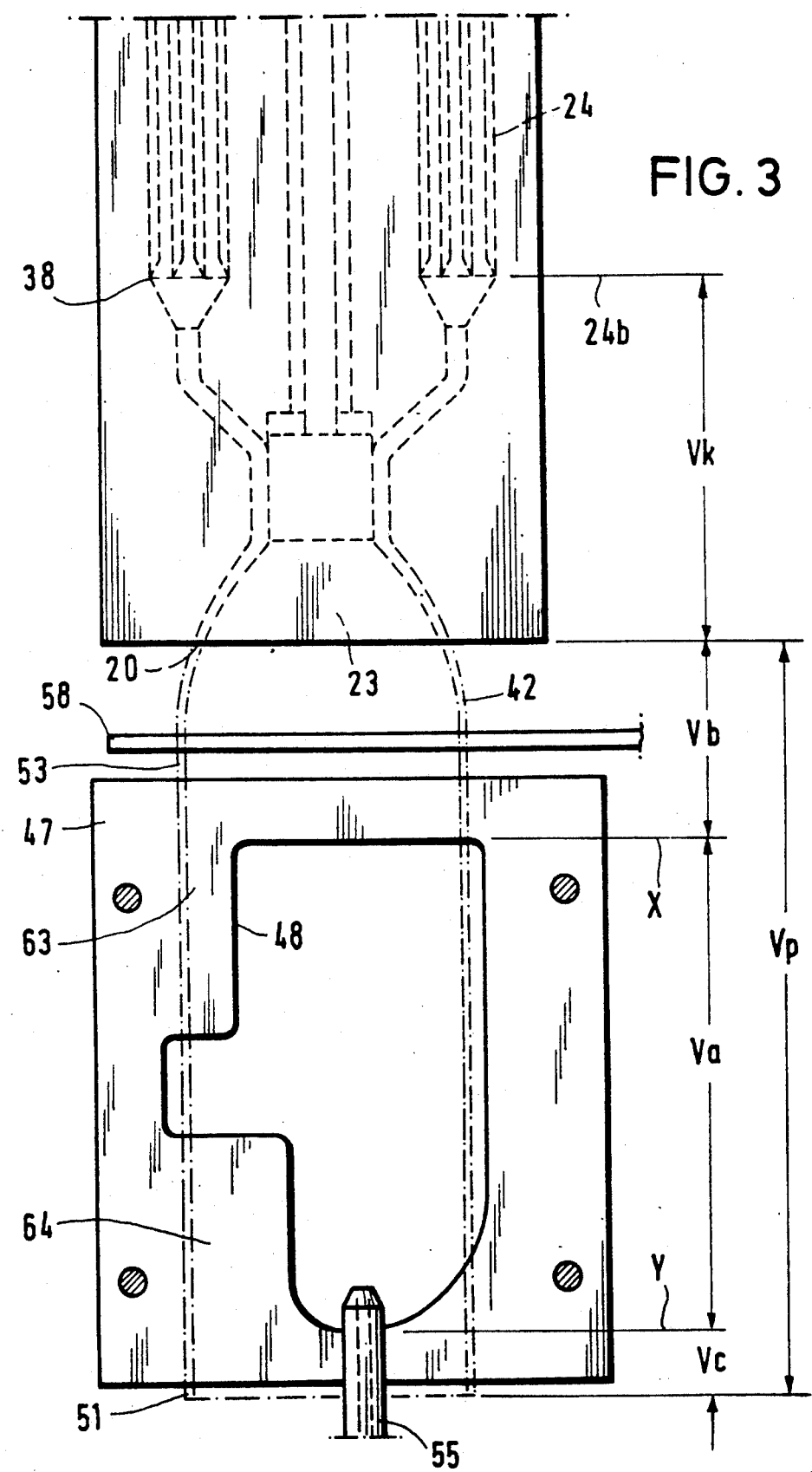
FIG. 3 is a side view of the structure shown in FIGS. 1 and 2, FIGS. 4a–d are diagrammatic views in section through a part of the extrusion head of the embodiment shown in FIGS. 1 to 3, illustrating the annular piston in four successive positions.

During the emptying stroke movement of the piston 24, the laminate material which, prior to the beginning of the operation of ejecting same through the outlet opening 20, as shown in FIG. 4a, is between the end 24b of the storage chamber which is towards the outlet opening 20, and the outlet opening 20 itself, being therefore in the communicating duct 29, is ejected from the extrusion head 10 by the material which is displaced under the effect of movement of the piston 24, as indicated by the volume Vs, and the material indicated by the volume Ve, which was added during the emptying stroke movement of the annular piston 24 by virtue of operation of the extruders being continuous, thereby forming a preform 42 of a volume as indicated at Vp for example in FIGS. 1, 2 and 3. Accordingly, the preforms which are produced in that working cycle are composed of a portion Vs which results from the material stored in the storage chamber, and a portion Ve which was added during the emptying stroke movement of the piston. The two portions Vs and Ve are also spatially separated from each other in the preform 42, the portion Ve being disposed at the end of the respective portion Vp in the direction of flow of the material through the communicating duct 39.

Different pressure conditions obtain in the extrusion head during the filling operation on the one hand and the emptying operation on the other hand, with the result that, when a transition is made from one phase of operation to another, variations in pressure occur, which can result in pressure imbalances in the system. A condition of pressure equilibrium is restored again after the beginning of the respective phase of operation. Thus, a condition of pressure equilibrium obtains during the ejection operation in the system formed by the individual flows of material and the laminate structure 40, so that at the laminate-formation location the flows of material forming the respective layers as indicated at 40a, 40b and 40c in for example FIG. 1, to constitute the laminate structure 40, combine together as they leave the annular ducts 34a, 35a, and 36a, to form a laminate structure which is of a regular configuration in respect of thickness and relative arrangement of the individual layers. In that connection the choice of materials for forming the individual flows of material is such that the resulting layers 40a, 40b and 40c are securely bonded to each other at the surfaces thereof at which they are in contact with each other.

The above-described operating conditions and the properties of most plastic materials, as already discussed in the opening part of this specification, mean that, in the first phase of the emptying stroke movement of the annular piston 24, the rise in pressure produced by the movement of the piston 24 initially causes a certain amount of compression of the material, with at the same time a reduction in the volume of the material contained in the storage chamber 28 and in the duct systems disposed upstream thereof, for example in the annular ducts 34a, 35a and 36a, before the laminate material which is formed from the individual flows of material and which is disposed at the lower end of the storage chamber 28 beings to move, as a consequence of the displacement of the annular piston 24. That would possibly have no or only a slight effect if all the materials forming the respective flows behaved in the same manner and the duct systems were of the same volumes. That however is generally not the case. On the contrary, different materials can be compressed to different degrees and in practice the individual layers of material making up the laminate structure are frequently of different thicknesses. As the endeavour is to ensure that the individual flows of material are moving in the laminate-formation region at speeds which are as little different from each other as possible, the duct systems are frequently of different volumes, in accordance with the thicknesses of the individual layers, with the above-described consequence.

All those influences which occur essentially simultaneously and which are thus superimposed on each other and which cannot be readily defined in respect of their magnitude and in regard to the consequences thereof initially produce an effect in the first phase of the emptying stroke movement of the annular piston 24 as it is in that phase that the change in the operating conditions in the extrusion head 10, at the end of the storage operation in which the material is stored in the storage chamber 28 and the subsequent commencement of the emptying operation, mean that there is a considerable rise in pressure, with the result that in the laminate-formation region, that is to say directly beneath the free end 38 of the annular piston 24, there is a condition of pressure imbalance, as a result of which the flow movements of the individual flows of material forming the layers of the laminate structure become irregular and are irregularly positioned in terms of their absolute and relative positions, while possible also being of thicknesses which differ from their respective desired or reference thicknesses. The material which has already been stored in the storage chamber remains unaffected thereby as it is already in laminate form. After the emptying stroke movement of the annular piston 24 begins, a condition of pressure equilibrium is restored, which causes the formation of a laminate of regular and uniform structure.

A further irregularity may occur at the beginning of the filling stroke movement of the piston 24, and possibly even already at the end of the preceding emptying stroke movement, more particularly by virtue of the materials forming the individual layers experiencing an expansion or decompression effect, after the pressure forces applied by the annular piston 24 to the material cease to be so applied. That situation results in decompression of the material between the storage chamber 28 and the outlet opening 20, within the communicating duct 39. That does not have disadvantageous consequences in regard to that material as the material in the communicating duct 39 is already in laminate form. However the decompression effect and the resulting increase in volume of the material in question will again have a disadvantageous effect in the region directly beneath the free end 38 of the annular piston 24, at the beginning of the filling stroke movement of the piston, which now begins. Added to that in both cases are the variations in volume caused by the above-described influencing factors in the duct systems upstream of the laminate-formation region as considered in the direction of flow of the material.

The structure of that laminate portion which is formed during the emptying stroke movement of the piston 24 will generally be satisfactory, with the exception of the laminate portion which is formed at the beginning of the emptying stroke movement, when there is a condition of pressure imbalance in the extrusion head, However it is not possible to exclude the possibility that, at least when using certain plastic materials, that laminate portion may be of a different nature and structure from the laminate portion formed during the filling stroke movement, in particular by virtue of the differences in the pressure conditions obtaining within the extrusion head.

The operating conditions which occur within a working cycle, and the effects thereof, in regard to the structure of the preform which is produced in a working cycle, are represented in graph form in FIG. 5 to which reference is now made. The cycle time is shown on the abscissa while the volume of material is shown on the ordinate. In the operating procedure which is assumed to take place in relation to the FIG. 5 graph, which corresponds to the procedure described hereinbefore with reference to FIGS. 4a through 4d, the cycle time is made up of the time required for filling the storage chamber 28 and the time required in order to eject the material in the storage chamber 28, after the storage chamber 28 has been filled. The time for the emptying stroke movement is substantially shorter than the filling time.

To the right of the co-ordinate system in FIG. 5, represented therein is the distribution of the portions by volume in a preform 42 which is produced during a working cycle, of a volume as indicated at Vp, over the length of the preform in relation to the co-ordinate system, thereby indicating that certain portions of the preform are operatively associated with certain parts of the procedure involved in the working cycle.

The curve portion 44 shows the procedure involved in the filling operation, thus illustrating the increase in volume of stored material in the storage chamber 28, in dependence on time. The pitch of the curve portion 44 corresponds to the delivery of all extruders. The filling stroke movement is terminated as soon as the annular piston 24 has reached its upper limit position 24a which is away from the outlet opening 20, and the storage chamber 28 is thus filled with laminate, the volume thereof being indicated by Vs.

In the course of the following ejection stroke movement, in the course of which the annular piston 24 moves from the position shown in FIG. 1 or FIG. 4b into the position shown in FIG. 2 or FIG. 4a, the laminate in the storage chamber 28, of a volume Vs, is displaced towards the outlet opening 20. At the same time, the end of the stored laminate structure which is the trailing end as considered in the direction of movement thereof receives further added extruded material coming from the continuously operating extruders. The volume of that added material increases as the ejection operation continues and at the end of the ejection stroke movement constitutes the volume indicated at Ve. The portion of material which is added by continuing operation of the extruders in that way corresponds to the curve portion 44a. In the first phase of the extrusion stroke movement, a sub-portion Vvs is produced from the added extruded material Ve; the sub-portion Vvs is part of the portion Ve and, by virtue of the variation in pressure which occurs at the beginning of the ejection operation, may be of a disturbed structure in the sense that the individual layers of the laminate are not uniform or complete and/or are not in their correct positions. As soon as a condition of pressure equilibrium is restored in the system in the course of the further part of the ejection operation, a portion indicated at Vd follows the sub-portion Vvs; the portion Vd consists of laminate which is of a generally regular structure but which may be of a nature differing from that of the laminate 40, of a volume indicated Vg in FIG. 5, which was stored in the storage chamber 28. The portion Vvs and Vd together form the portion Ve which was added to the stored laminate material by continuing operation of the extruders, during the ejection stroke movement. FIG. 5 also shows that the portion Vp which constitutes the preform 42 comprises two portions Vs and Ve, the latter of which is made up of two portions Vve and Vd.

At the latest at the beginning of the subsequent filling stroke movement, in the course of which the annular piston is moved from position 24b into position 24a as indicated by the curve 44, there is again a change in pressure within the extrusion head 10, with the result that the laminate sub-portion Vve which is formed in the storage chamber 28 at the beginning of the filling stroke movement can also be of an irregular configuration and thus disturbed. However, a condition of pressure equilibrium is restored again at the laminate-formation location soon after the beginning of the filling stroke movement so that the laminate which is produced under those conditions in the storage chamber 28 is again of a uniform and undisturbed configuration.

The disturbed laminate sub-portion Vve which is formed at the beginning of the filling stroke movement adjoins the previously formed laminate portion Ve which includes the sub-portion Vvs. Accordingly the portion Ve including the sub-portion Vvs of disturbed laminate and the sub-portion Vve of disturbed laminate represent a continuous portion Vv within the laminate formed in the extrusion head 10.

As soon as the annular piston 24 has reached its upper limit position 24a, an emptying stroke movement thereof begins again, in the course of which the annular piston 24 is displaced from its position 24a into its lower position 24b. The curve portion indicated at 45 in FIG. 5 corresponds to the reduction in the volume of material stored in the storage chamber 28 during the emptying stroke movement of the piston 24. As the volume of material in the storage chamber during the filling operation depends on the respective position occupied by the annular piston 24, the co-ordinate system with the curve portions 44 and 45 can also be interpreted as a travel-time diagram, in respect of the movement of the piston 24 which takes place during a working cycle. In that respect the abscissa corresponds to the lower limit 24b of the storage chamber 28. The distance between the abscissa and the line 24a therefore corresponds to the volume Vs of the storage chamber 28 and thus the volume of the material stored therein at the end of the filling stroke movement.

It will be seen from the foregoing that the portion Vv, the production of which is shown in FIG. 8 and the possible relative position of which, within a preform 42, is represented in FIG. 8 in conjunction with FIG. 7d, consists of two sub-portions Vvs and Vve of disturbed laminate, as well as a sub-portion Vd which is arranged between the two sub-portions Vvs and Vve and which is delimited thereby.

Reverting now to FIG. 1, disposed beneath the extrusion head 10 is a blow molding mold 47 comprising first and second mold portions or halves 47a and 47b. The two mold halves are provided at their mutually facing sides with respective recesses as indicated at 48a and 48b for example in FIG. 2. When the mold is in the closed condition as shown in FIG. 1, those recesses combine to form a mold cavity 48. The mold halves 47a and 47b are also provided with squeeze-off edges 49a, 49b; 50a and 50b, at least in the regions at which excess material is to be squeezed off the preform 42 when the mold is closed, by virtue of the two mold halves 47a and 47b coming together. That is normally the case at both ends of the preform 42.

When the preform 42 is ejected from the extrusion head 10, the mold 47 is open (see FIG. 2). The overall portion Vp of material, which constitutes the preform and which is initially disposed between the two mold parts 47a and 47b of the opened mold 47 is longer than the vertical dimension of the mold cavity 48 which is formed from the two recesses 48a and 48b when the mold 47 is in a closed condition. At the lower end of the mold cavity 48 is an end portion Vc which is disposed beneath the tangent y which extends normal to the longitudinal axis of the preform 42, at the squeeze-off edges 50a and 50b at that end of the mold 47. The upper end of the overall portion Vp of material forming the preform 42 has an end portion as indicated at Vb which is disposed above the tangent x at the edges 49a and 49b on the mold halves 47a and 47b at the upper end of the mold, that is to say, also outside the mold cavity 48. When the mold 47 is closed by movement of the two mold halves 47a and 47b into the position shown in FIG. 1, the end portions Vc and Vb which are to be found on the preform 42 at the top and bottom ends thereof are squeezed off by the associated edges 50a, 50b and 49a, 49b respectively, those end portions constituting excess material representing waste which is generally recycled.

Referring now to FIG. 3, it will be seen therefrom that portions 63 and 64 of the preform 42 are also disposed outside the mold cavity 48 at the left-hand side region in FIG. 3. That means that the portions 63 and 64 of the preform 42 which are disposed laterally beside the mold cavity 48 are also squeezed off by the mold 47 when the mold is closed. Such a mode of operation is sometimes necessary, particularly when the article to be produced is of a complicated configuration. That procedure is part of the state of the art and is not a part of the present invention which is concerned with the waste portions 51 and 53 above and below the respective tangents x and y as described above.

The region of the central portion Va of the preform 42, which remains within the mold cavity 48 and thus between the squeezing-off edges 50a and 50b on the one hand and 49a, 49b on the other hand is expanded until it comes to bear against the inside surface of the mold cavity 48, by means of a pressure fluid which is introduced through a blow molding mandrel 55 into the interior of the region of the central portion Va, which is in the mold cavity 48. That results in the article indicated at 57 in FIG. 1, which at its two ends has the two flash or waste portions 51 and 53 formed by the material originating from the end portions Vc and Vb of the preform 42. Those waste portions 51 and 53 generally remain joined to the expanded article 57 by way of thin web portions which are severed when the waste portions 51 and 53 are removed. The operation of removing the waste portions is mainly effected after the article 57 has adequately cooled down and after the mold 47 has been opened; when the article 57 is an article of substantial size, it can be removed from the mold 47 by a gripper arrangement as indicated at 58 in FIG. 3 and comprising first and second gripper members which are diagrammatically indicated at 58a and 58b, for engaging the upper waste portion 53.

When the portion 57 is removed from the mold 47, the upper end of the waste portion 53 is torn off at the outlet opening 20 of the extrusion head 10 because it is at that point that the material is still at its hottest temperature and is thus at its softest. The length and therewith the volume of the overall portion Vp which represents the preform 42 is determined by the distance between its lower free end and the outlet opening 20 of the extrusion head 01. As the dimension of the communicating duct 39 between the end position 24b of the annular piston 24, which is towards the outlet opening 20, and the outlet opening 20 itself, is so selected in the embodiment illustrated in FIGS. 1 through 5 that the volume Vk of the communicating duct 39 corresponds to the volume Vp of a preform 42, the material which is displaced into the communicating duct 39 during an emptying stroke movement on the part of the piston 24, by the continuously operating extruders, and which corresponds to the sum of the volumes Vs and Ve remains in the communicating duct 39 for a period corresponding to the duration of a working cycle before in the subsequent working cycle it is then ejected from the extrusion head 10 through the outlet opening 20 thereof and is cut off at the outlet opening 20, in conjunction with the operation of producing the article 57.

The above-indicated arrangement can provide that the regions in the laminate, which are possible produced in each working cycle and which are either disturbed, like the sub-portions Vve and Vvs, or which possibly differ in regard to their general nature from the laminate in the portion Vg thereof, as shown in FIG. 5, as may be the case for example with the sub-portion Vd, can be positioned in at least one of the two end portions Vb and Vc respectively of the preform. When the mold 47 is closed, those end portions remain outside the mold cavity and are therefore not a part of the article 57 produced by expansion in the mold cavity 48.

In a modification of the embodiment described above with reference to FIGS. 1 through 5, the volume indicated at Vk of the communicating duct 39 may also correspond inter alia to an integral multiple of the volume Vp of the overall portion constituting the preform 42. The effect which is produced in both cases is described in greater detail hereinafter with reference to FIGS. 6a and 6b which are highly diagrammatic views in longitudinal section through one half of that region of the extrusion head 10, which includes the communicating duct 39. Between the plane 24b in which the annular piston 24 is disposed at the end of the emptying stroke movement thereof, and the outlet opening 20, the communicating duct 39 is of a volume Vk which amounts to 2 Vp and is accordingly of such a size that it corresponds to the volume of material required to produce two preforms 42 that are to be successively extruded.

Figure 6A:
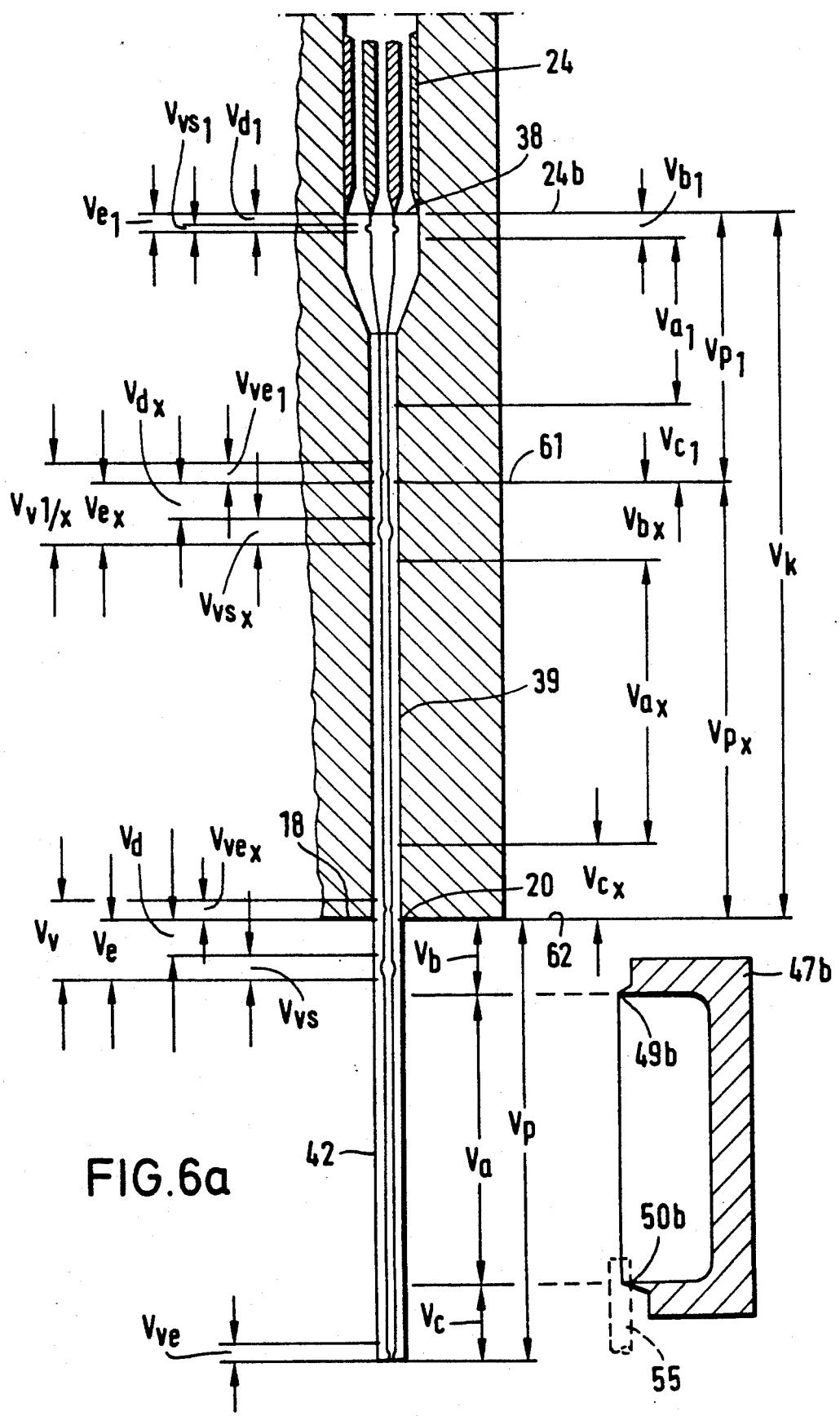
FIGS. 6a and 6b show parts of an extrusion head on an enlarged scale, showing the position of the components at the end of two successive working cycles.
Figure 6B:
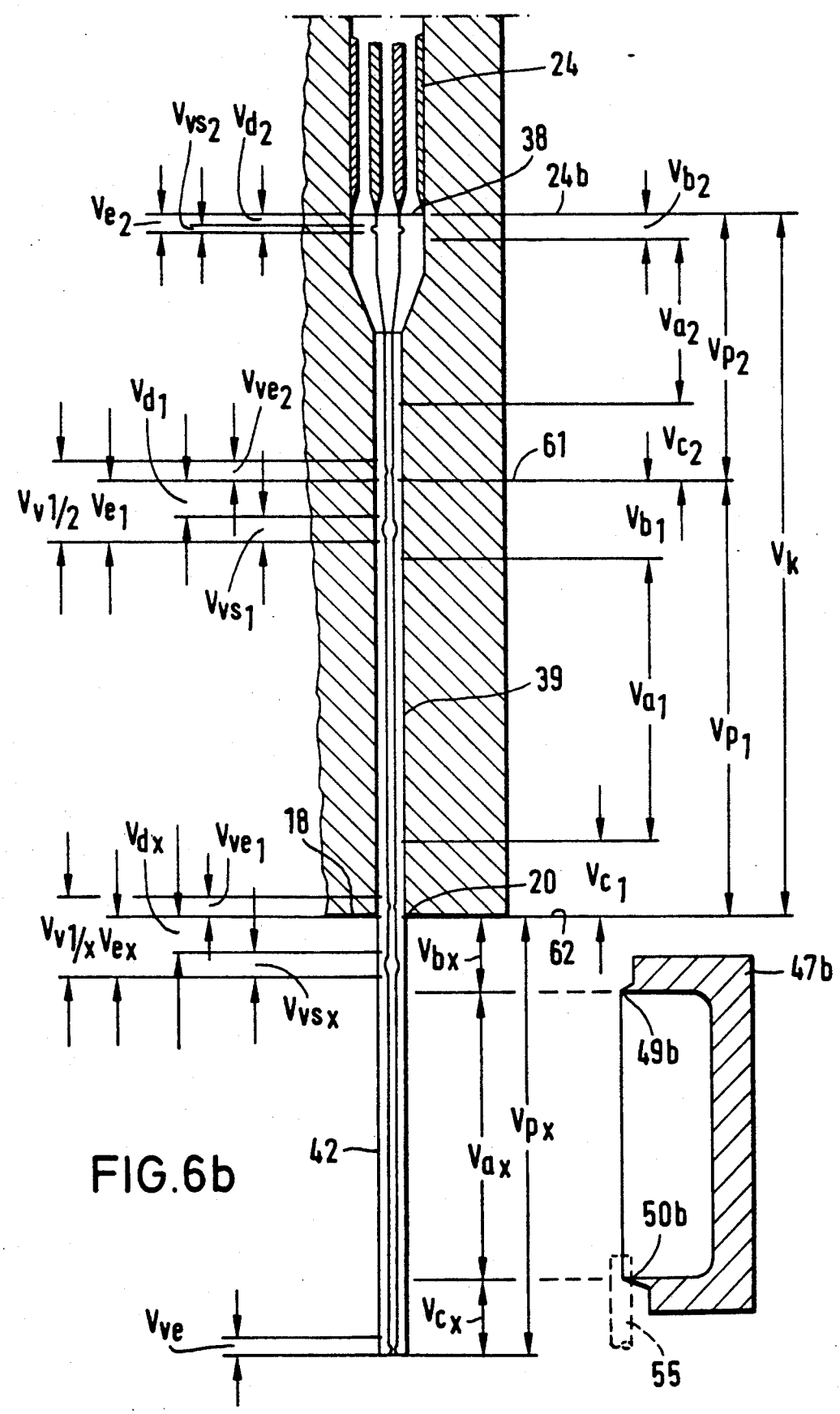

In FIGS. 6a and 6b, components which correspond to the components of the embodiment described above with reference to FIGS. 1 to 5 are denoted by the same reference numerals.

FIGS. 6a and 6b show the operating condition at the end of respective ones of two successive emptying stroke movements of the piston 24. In the operating condition shown in FIG. 6a, at the end of the first emptying stroke movement, the communicating duct 39 contains the two overall portions of material, as indicated at Vp1 and Vpx, which are disposed in succession in the direction of flow of material and each of which is equal to the volume Vp required for a preform 42, in accordance with the above-indicated requirement. The portion Vpx is disposed directly upstream of the outlet opening 20 in the condition shown in FIG. 6a while the portion Vp1 fills the region between the portion Vpx and the plane 24b defining the boundary of the storage chamber 28, which is towards the outlet opening 20. Directly below the plane 24b in the portion Vp1 is a sub-portion Ve1, the formation of which during the preceding emptying stroke movement has already been described above in relation to FIGS. 4a through 4d and 5. The sub-potion Ve1 therefore forms the end region of the portion Vp1, which is the trailing end region as considered in the direction of flow of the laminate; it is within the end portion Vb1 but is shorter than the latter and terminates at a spacing from the central portion Va1. The portion Ve1 is composed of the sub-portion Vvs1 and the sub-portion Vd1 of which the sub-portion Vvs1 represents a region of the disturbed laminate.

In the following working cycle the annular piston 24 is firstly displaced upwardly by the material coming from the extruders, with the storage chamber 28 being simultaneously filled with that material. At the beginning of that filling stroke movement, the material is affected by irregular pressure conditions and other influencing factors at the laminate-formation location, that is to say directly in front of the end face 38 of the annular piston 24 which is disposed just above the plane 24b during that first phase in the filling operation. The result of the above-indicated irregular pressure conditions is that the laminate which is formed in the first phase of the filling stroke movement in the storage chamber 28 can also be disturbed. That involves the sub-portion Vve2 which thus directly adjoins the portion Ve1 (FIG. 6b). As soon as a condition of pressure equilibrium has occurred, the laminate is formed with a regular structure during the remainder of the filling stroke movement, in the storage chamber 28.

In the subsequent emptying stroke movement, the overall portion Vp2 is formed in the communicating duct 39 (see FIG. 6b); the portion Vp2 occupies the place of the portion Vp1 and displaces the later towards the outlet opening 20 into the position which was previously occupied by the portion Vpx which at the same time is ejected from the extrusion head 10 to form a preform 42. The operating condition of the arrangement at the end of that emptying stroke movement is illustrated in FIG. 6b. In that situation the portion Ve1 of the overall portion Vp1 and the sub-portion Vve2 of the next overall portion Vp2 from the portion Vv1/2 which contains a laminate whose two sub-portions Vvs1 and Vve2 are disturbed while the sub-portion Vb1 which is disposed between same contains a laminate of normal structure which however can differ in a different respect from the natural of the laminate in the central portion Va.

Therefore at the end of that emptying stroke movement the operating condition which obtains is one in which the notional separation plane 61 between the portions Vp2 and Vp1 passes through the at least partially disturbed portion Vv1/2 and subdivides same in such a way that the sub-portion Vve2, which is remote from the outlet oepning 20, is a part of the overall portion Vp2 and is within the same part of the end portion Vc2 and thus what will subsequently become a waste portion 51, while the portion Ve1 which is towards the outlet opening 20 is part of the overall portion Vp1 and is within the same part of the end portion Vb1 from which a waste portion 53 is subsequently formed. The sub-portions Vve2 and the pertain Ve1 are shorter than the respective end portions Vc2 and Vb1 respectively so that the portion Vv1/2 does not extend into the central portion Va1 or Va2 from which an article 57 is to be produced by being expanded in the mold 47.

A corresponding situation also applies in regard to the other overall portions Vp (see FIG. 6a) and Vpx (see FIG. 6b), in which the central portions, end portions and sub-portions are denoted by corresponding reference characters.

In the subsequent working cycle, after preceding filling of the storage chamber 28, the overall portion Vp1 of material is ejected through the outlet opening 20 of the extrusion head 10 so that at the end of the emptying stroke movement it forms a preform 42 which hans from the extrusion head and thus occupies the position of the overall portion Vp shown in FIG. 6a. The portion Vp2 then occupies the position of the portion Vpx shown in FIG. 6a. The following description is therefore set forth with reference to the two overall portions Vp and Vpx in FIG. 6a. The plane 62 in which the outlet opening 20 is disposed represents the plane of separation between the two portions Vp and Vpx. The plane 62 is not a notional plane as, after the flowing mold 47 has been closed around the preform 42 and possibly after expansion of the preform 42 in the mold 47, the portion Vp that is to say the article 57 produced therefrom and the waste portion 53 thereof, which corresponds to the end portion Vb, is separated in the plane 62 from the material in the extrusion head 10, that is to say the portion Vpx.

Similar to the plane 61, the separating palne 62 also passes through the portion Vv of disturbed laminate which is to be found at both sides of the outlet opening 22 and of which the sub-portion Vvex remains with the overall portion Vpx until the next working cycle in the extrusion head 10, that is to say in the part of the communicating duct 39 which is adjacent the outlet opening 20, whereas the portion Ve is part of the overall portion Vp which forms the preform 42 and is already outside the extrusion head 10 and is thus separated from the extrusion head, with the preform and the article to be produced therefrom. In the next following working cycle in which the overall portion Vpx is ejected through the outlet opening 20, the sub-portion Vvex of the portion Vv, at the free end of the preform 42, is in the region of the end portion Vcx which remains outside the mold cavity 48 when the mold 47 is closed and forms the lower waste or flash portion 51 on the expanded article 57. The sub-portion Vvex then occupies the position of the portion Vve in FIG. 6a.

Using simple means, the above-described operating procedure makes it possible for the sub-portion Vve, Vvs and Vd each to be positioned in the respective end portions Vb and Vc of the preform-forming portion Vp, which, when the flowing mold 47 is closed, are squeezed off the central portion Va from which the article 57 is subsequently produced. That ensures that the central portion Va and therewith the finished article 57 do not have any wall regions in which the laminate is of an irregular configuration or is otherwise of a nature which differs from the normal nature of the laminate structure.

In the procedure described above with reference to FIGS. 6a and 6b, the respective portion Vv with at least partly undesired or uncontrollable properties is divided in the plane 62 in such a way that its sub-portions Vve, Vvs and Vd are positioned in two end portions Vb and Vc respectively, which are squeezed off on two preforms produced in successive working cycles. That means that each of the waste or flash portions 51, 53 which are produced from the end portions Vc and Vb only needs to accommodate one sub-portion of the laminate portion Vv of disturbed laminate. It has been found in a practical context that the length of the end portions Vc and Vb for producing the waste or flash portions 51 and 53 respectively, which length is required in any case by virtue of the operating procedures involved, is generally sufficient to accommodate the sub-portions Vve, Vd and Vvs of the overall portion Vv of disturbed laminate. It is however perhaps also possible for the arrangement to be such that the entire portion Vv of disturbed laminate is positioned in only one of the two waste portions 51 or 53.

The conditions to be observed in regard to positioning of the portion Vv which has the undesired properties are described hereinafter with reference to FIGS. 7a through 7d. Those Figures are greatly simplified views of the respective region between the end 24b which is towards the outlet opening 20, of the storage chamber 28 which corresponds to the position occupied by the free end face 38 of the annular piston 24 at the end of the ejection or emptying stroke movement, and the lower end of the preform which hangs from the extrusion head 10, in four different embodiments as indicated by a–d, in which the communicating ducts 39 are respective of different volumes as indicated at Vk.

The construction shown in FIG. 7c corresponds to the embodiment shown in FIGS. 1 through 5 in that the volume VK(c) of the communicating duct 39(c) is equal to the volume of the preform 42(c), that is to say the portion Vp. Consequently the disturbed sub-portion Vve(c) and the portion Ve(c) are so arranged in the preform 42(c) that the sub-portion Vve(c) is in the end portion Vc from which the flash or waste portion 51 is produced. The portion Ve(c) with the two sub-portions Vd(c) and Vvs(c) is within the end portion Vb from which the waste portion 53 between the mold cavity 48 and the extrusion head 10 is produced. This in the embodiment shown in FIG. 7c the plane within which the outlet opening 22 of the extrusion head 10 is arranged extends between the sub-portion Ve(c) of the portion Vp which hangs from the extrusion head 10 and which forms the preform 42(c), and the sub-portion Vve(c) of the portion Vp1 for the next following preform, which is to be found in the communicating duct 39(c). The blow molding mold half 47b shown beside the views a through d in FIG. 7 illustrates that, with that positioning of the at least partially disturbed portions of laminate, the planes x and y in which the end portions Vb and Vc are each separated from the central portion Va from which the article is made are at a spacing from the portions Vve(c) and Ve(c) are of a somewhat greater axial dimension, they still remain within the end portions Vb and Vc which represent excess material and therefore waste.

In all cases the portion Vv consists of three sub-portions Vvs, Vd and Vve, wherein the sub-portions Vvs and Vve, by virtue of the pressure imbalances which occur in certain phases of operation, within the extrusion head, can be disturbed in such a way that there is no laminate of uniform structure. Between the two sub-portions Vvs and Vve is the sub-portion Vd which will generally be of a uniform structure but which, by virtue of the different conditions under which it is formed, as described above, may have different properties and qualities from the laminate which, apart from the sub-portion Vve, had been formed during the filling stroke movement for filling the storage chamber 28. The length of the sub-portion Vd will substantially depend on the speed at which the emptying stroke movement of the annular piston 24 takes place and thus the period of time required to carry out the emptying stroke movement.

In the embodiment shown in FIG. 7c, the above-described operating conditions which obtain during a working cycle result in the portion Vv of disturbed laminate being distributed in an irregular fashion between the two end portions Vb and Vc in such a way that the end portion Vb has a comparatively large proportion of the portion Vv, namely the portion Ve which is made up of the two sub-portions Vvs and Vd, whereas the end portion Vc only has to accommodate the comparatively short sub-potion Vve of disturbed laminate structure. That can be undesirable for example if for any operational reasons the end portion Vb is shorter than the end portion Vc. If both end portions are of approximately the same volume and are thus also approximately of the same length, as will frequently be the case, it may be desirable for the volume Vk of the communicating duct 39 to be such that the separation plane 62 passes through the sub-portion Vd so as to provide that the portion Vv is more uniformly disturbed as between the two end portions Vb and Vc of two successive preforms. That can be achieved if, as illustrated in the construction shown in FIG. 7b, the volume Vk(b) of the communicating duct 39(b) is larger than Vp but smaller than the admissible maximum volume Vp+Vc−Vve. In this case the portion Vv(b) of disturbed laminate structure is distributed as between the two end portions Vb and Vc in such a way that a part of the sub-portion Vd(b) is positioned in the end portion Vc. The separating plane 62 passes through the sub-portion Vd(b). In this case also the arrangement is one in which the components of the portion Vv(b) of disturbed laminate structure are respectively positioned at a spacing from the planes x and y in the end portions Vb and Vc respectively, but the spacings are less different from each other than in the case of the embodiment shown in FIG. 7c. The result of the volume of the communicating duct Vk(b) being larger than in the embodiment shown n FIG. 7c is that the laminate formed during an emptying stroke movement of the annular piston 24 does not completely fill the communicating duct 39(b). On the contrary, at the end of the emptying stroke movement, a short piece of the overall portion formed in the preceding working cycle remains in the communicating duct 39(b) with the above-mentioned consequence that the separating plane 62 extends through the sub-portion Vd(b) which was formed in the preceding working cycle.

The communicating duct 39(a) in the embodiment shown in FIG. 7a is of even larger volume Vk(a) than the communicating duct Vk(b) as Vk(a) is equal to Vp+Vc−Vve. It therefore corresponds to a limit condition, namely the maximum admissible value in respect of Vk, with the result that the end portion Vc of the preform 42(a) almost entirely consists of the portion Vv(a) of the disturbed laminate and the limit or boundary between that portion Vv(a) and the central portion Va from which the article 57 is to be produced lies in the plane in which the end portion Vc is squeezed off the central portion Va by the squeezing-off edges 50a and 50b, thereby forming the waste or flash portion 51. With such dimensioning in respect of the communicating duct 39(a), there is no laminate consisting of the portion Vv(a) in the end portion Vb of the preform 42(a).

The embodiment shown in FIG. 7a shows that, when the admissible maximum volume Vp+Vc−Vve in respect of Vk is exceeded, a part of the portion Vv of disturbed laminate would project beyond the lower end portion Vc into the central portion Va.

In the case of the embodiment shown in FIG. 7d, the volume Vk(d) of the communicating duct 39(d) is smaller than in the embodiment shown in FIG. 7c. However the volume Vk(d) still satisfies the condition $Vk \geq Va + Vc + Ve$ defining the admissible minimum value of the communicating duct 39. In actual fact the volume Vk(d) complies with the minimum limit condition in respect of the minimum volume for Vk, with the result that the entire portion Vv(d) of disturbed laminate is positioned in only one end portion, namely the end portion Vb, of the preform 42(d). The end portion Vb gives rise to the waste portion 53 which is to be found between the mold cavity of the blowing mold and the extrusion head 10. The way in which the portion Vv(d) is positioned within the end portion Vb also shows that the limit between the portion Vv(d) or the sub-portion Vve(d) thereof on the one hand, and the central portion Va for producing the article 57 on the other hand, coincides with the plane x in which the squeezing-off edges 49a and 49b of the blowing mold 47 squeeze the end portion Vb off the central portion Va, forming the waste or flash portion 53. The result of the communicating duct 39(d) being of smaller volume than in the embodiment shown in FIG. 7c is that a part of the laminate which is formed in the communicating duct during the emptying stroke movement of the piston 28, which is the same in all embodiments a through f, is advanced beyond the plane 62 into the preform 42(d) formed in the same emptying stroke movement. When the volume falls below the admissible minimum vole $Va+Vc+Ve$ in respect of Vk, a part of the portion Vv of disturbed laminate would project beyond the end portion Vb into the central portion Va from which the article 57 is to be produced within the mold 47.

The embodiments shown in FIGS. 7a and 7b illustrate that, with increasing volume Vk in respect of the communicating duct 39, the proportion of the disturbed proton Vv which is to be found in the end portion Vc at the end of the preform 42 remote from the outlet opening 20 of the extrusion head 10 increases. The embodiment in FIG. 7d shows that, with a decreasing volume Vk in respect of the communicating duct 39, the proportion of the disturbed portion Vv which is in the end portion Vb which is towards the outlet opening 20 increases. That applies in both cases as long as the position of the portion Vv of disturbed laminate does not project beyond the plane y or x respectively into the respectively associated central portion Va.

When reference is made hereinbefore to the fact that with $Vk=Vp$, in the separating plane 62 defined by the outlet opening 22, the total portion Vv of disturbed laminate is separated in such a way that the one portion Ve is a part of the preform 42 which is suspended from the extrusion head 10 while the sub-portion Vve remains in the region of the communicating duct 39 which directly adjoins the outlet opening 20 and is thus a part of the overall portion Vp1 or Vpx which is disposed in the communicating duct 39 until the next working cycle, that involves a possible somewhat idealised description of the situation as the thermoplastic nature of the material forming the individual portions for constituting the respective preforms means that certain uncontrollable variations in the dimension of the material forming the individual portions are inevitable, in particular in the region of the outlet opening 20, fir example by virtue of a swelling action on the part of the plastic material, and such variations in dimension can mean that the relative position of the individual portions relative to the outlet opening 20 and therewith the plane 62 varies somewhat. It will be appreciated that a similar consideration also applies in regard to the position of the perform which is suspended from the extrusion head 10, relative to the mold 47 and to the squeeze-off edges 49a and 49b thereof. Under normal operating conditions however those variations are so slight that they are insignificant and at any event do not have an adverse effect on practical use of the present invention. The latter point also applies in regard to the position of the portion Vv of disturbed laminate or the sub-portions thereof, relative to the blowing mold 47, especially since, as can be seen in particular from the embodiments illustrated in FIGS. 7a through 7d, the end portions Vb and Vc which go to make up the waste or flash portions 53 and 51 are normally of a volume and therewith an axial extent which readily make it possible for the portion Vv of disturbed laminate to be so positioned in the end portions Vb and Vc respectively that it is at a spacing from the respectively adjacent plane x and y respectively, which even in the event of a minor axial shift in the position of the preform 42 relative to the mold 47, ensures that the portion Vv of disturbed laminate or the sub-portions thereof remains or remain outside the central portion Va from which the end product or article 57 is to be produced.

As the portion Vv also includes the portion Ve, the length of which depends on the volume of the material which is to be extruded during the ejection stroke movement, the length of the portion Ve and therewith the portion Vv of disturbed laminate structure is dependent on the time which the emptying stroke movement requires for performance thereof and the amount of material which is conveyed per unit of time by the extruders into the extrusion head 10. Those operational parameters generally depend on conditions, for example the properties and qualities of the plastic material and the level of productivity of the process for production of the articles in question, which do not take account of the length of the laminate portions Vv. Thus, in the event of an increase in the level of productivity of an extrusion unit, that is to say an increase in the amount of plastic material which is passed through the extrusion unit in each unit of time, the portion Vv will increase in length, with the conditions being otherwise the same.

With the operating procedure and apparatus in accordance with the present invention, it is possible to take account of such a situation by virtue of the fact that the portion Vv is distributed to the two end portions Vb and Vc which are required in any case for operational reasons, in such a way that both end portions are used in the optimum fashion for accommodating the sub-portions Vve and Vvs of disturbed laminate, and the sub-portion Vd which is to be found therebetween. In particular it is possible for the parts of the portion Vv, which are to be disposed in the individual end portions, to be adapted to the volume and thus the axial dimension of the end portions Vb and Vc, by virtue of a suitable choice in respect of the volume Vk of the communicating duct 39.

It will be appreciated that that does not exclude the possibility that in exceptional cases the portion Vv may be of a volume and thus a length which are greater than the necessary volume and thus overall length in respect of the end portions Vb and Vc. In such cases, in order to achieve the desired effect, that is to say to avoid laminate with undesirable properties being present in the central portion Va, at least one of the end portions Vb and Vc would have to be of greater volume and thus longer than would be necessary for purely operational reasons. In that respect also the teaching in accordance with the present invention affords the possibility of making optimum use of the end portions Vb and Vc in such a way that the volume and thus the length thereof do not need to be greater than is absolutely necessary for the accommodation of the portion Vv.

It has already been explained above that, in the embodiment shown in FIG. 5, the communicating duct 39 is delimited by the storage chamber 28, that is to say be the annular piston 24 in its limit position 24b in which it is toward the outlet opening 20 of the extrusion head 10, on the one hand, and by the outlet opening 20 itself on the other hand. Accordingly the volume Vk of the communicating duct 39 can be adjusted by suitable positioning of the range of stroke movement of the annular piston 24 and therewith the limit position 24b thereof. In that connection it is to be assumed that normally the total volume of the storage chamber which is available in the extrusion head 10 is larger than the volume required to produce a given preform 42. Accordingly, in the production of a given article, the stroke movement of the annular piston 24 is normally shorter than the axial dimension of the volume which is available overall for the storage of material. That means that normally the annular piston 24 only ever moves over a part of the axial extent of the total volume available as the storage chamber, with the stroke movement of the annular piston 24 determining the required volume Vs in dependence on the magnitude of the stroke movement and determining, in dependence on the positioning of its tow limit positions 24a and 24b, the position of the storage volume which is actually used within the maximum volume of the storage chamber 28 within the extrusion head 10.

On the assumption that the storage space in the chamber 28 which is effectively used is less than the maximum available storage volume, it is also possible to alter the volume Vk of the communicating duct 39, without altering the volume of the storage chamber 28, by arranging for the stroke movement of the annular piston 24 to be such that the spacing between its limit position 24b towards the outlet opening 20 on the one hand, and the outlet opening 20 itself on the other hand, provides the desired volume Vk in respect of the communicating duct 39. That then also gives the limit position 24a which is remote from the outlet opening 20.

The above-indicated possibility of adjusting the volume Vk of the communicating duct 39 by suitable positioning of the end points or limit positions 24a and 24b in respect of the stroke movement of the annular piston 24 will now be discussed with reference to FIGS. 9a and 9b. In the embodiment shown in FIG. 9a, the position of the end points as indicated at 24a(a) and 24b(a) in respect of the stroke movement of the annular piston 24(a) corresponds to the position of the corresponding limit positions or points of reversal of movement as indicated at 24a and 24b for the annular piston 24 in FIG. 4. In that situation the communicating duct 39(a) is of a volume which is somewhat smaller than the volume Vk(c) of the embodiment shown in FIG. 7a and somewhat larger than the volume Vk(d) in the embodiment shown in FIG. 7d. That is shown by a comparison between the positions of the portion Vv in each of the respective embodiments in question. The portion Vv(a) of disturbed laminate in the embodiment shown in FIG. 9a is so positioned that the boundary of the portion Vv(a), which is towards the annular piston 24(a), extends in the plane 62 in which the outlet opening 20 is disposed, in other words the portion Vv(a) is exclusively in the end portion Vb.

Figures 9A, 9B:
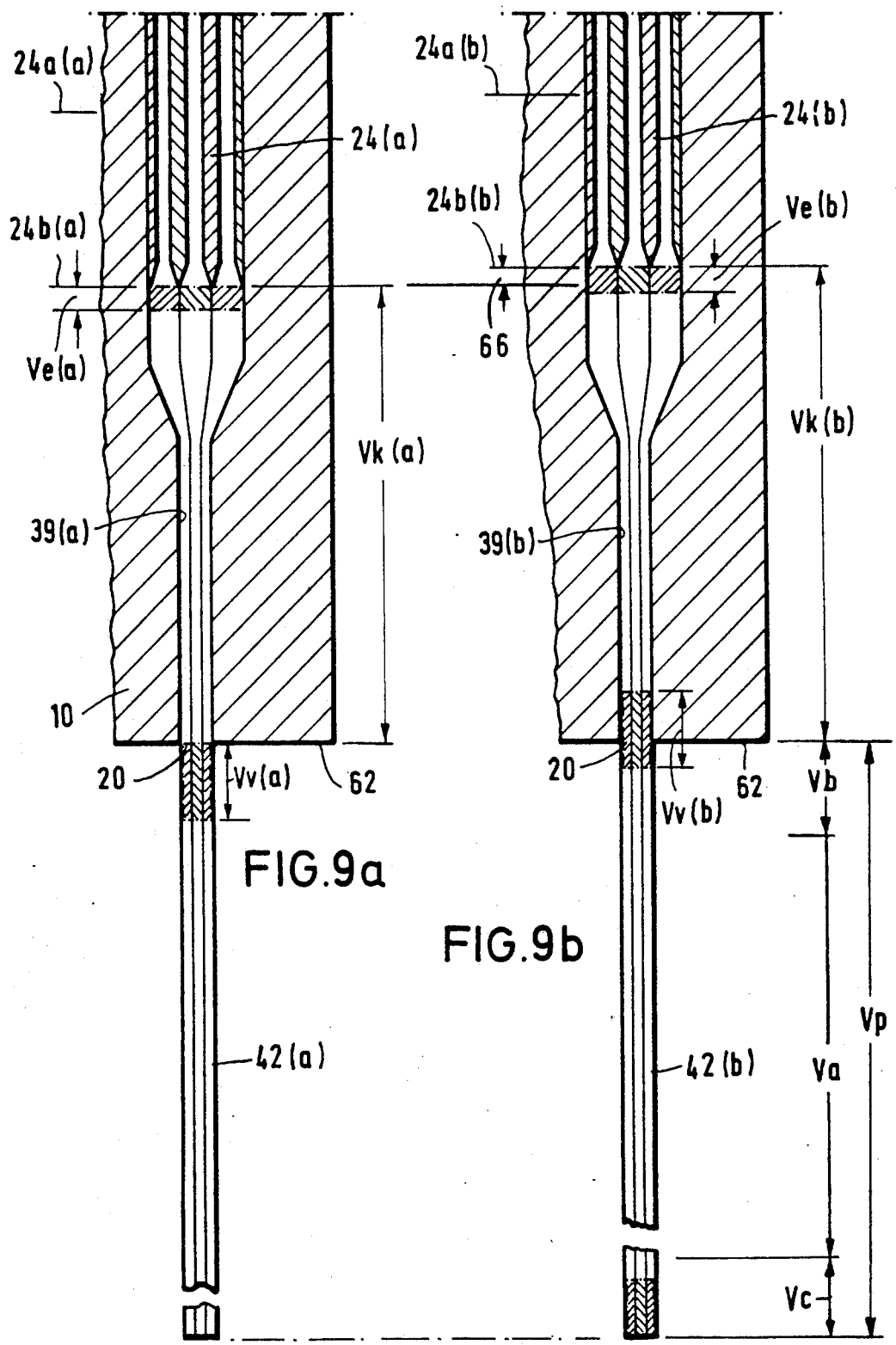

In the case of the arrangement shown in FIG. 9b, the end points or limit positions indicated at 24a(b) and 24b(b) in respect of the stroke movements of the annular piston 24(b) are so arranged that, with the same piston stroke movement so that the limit positions 24a(b) and 24b(b) are at an unaltered spacing from each other in comparison with the construction shown in FIG. 9a, the limit positions 24a(b) and 24b(b) are arranged at a spacing from the separating plane 62 and thus the outlet opening 20 which is respectively greater by the distance indicated at 66, than in the case of the arrangement shown in FIG. 9a. Accordingly the volume Vk(b) of the communicating duct 39(b) is also correspondingly larger than the volume Vk(a) of the communicating duct 39(a), with the result that the portion Vv(b) relative to the separating plane 62 is different, namely being so positioned that the plane 62 passes through the portion Vv(b). When the volume Vk(b) is of such a size, approximately corresponding to the volume Vk(b) in the embodiment shown in FIG. 7b, the portion Vv(b) of disturbed laminate is distributed to the end portions Vb and Vc of the preform 42(b) of the overall volume Vp. Thus, Vk and therewith the positions of the portion Vv can be adjusted to meet the respectively applicable requirements by suitable adjustment of the positions of the end points 24a and 24b of the stroke movement of the annular piston 24.

Figure 10:
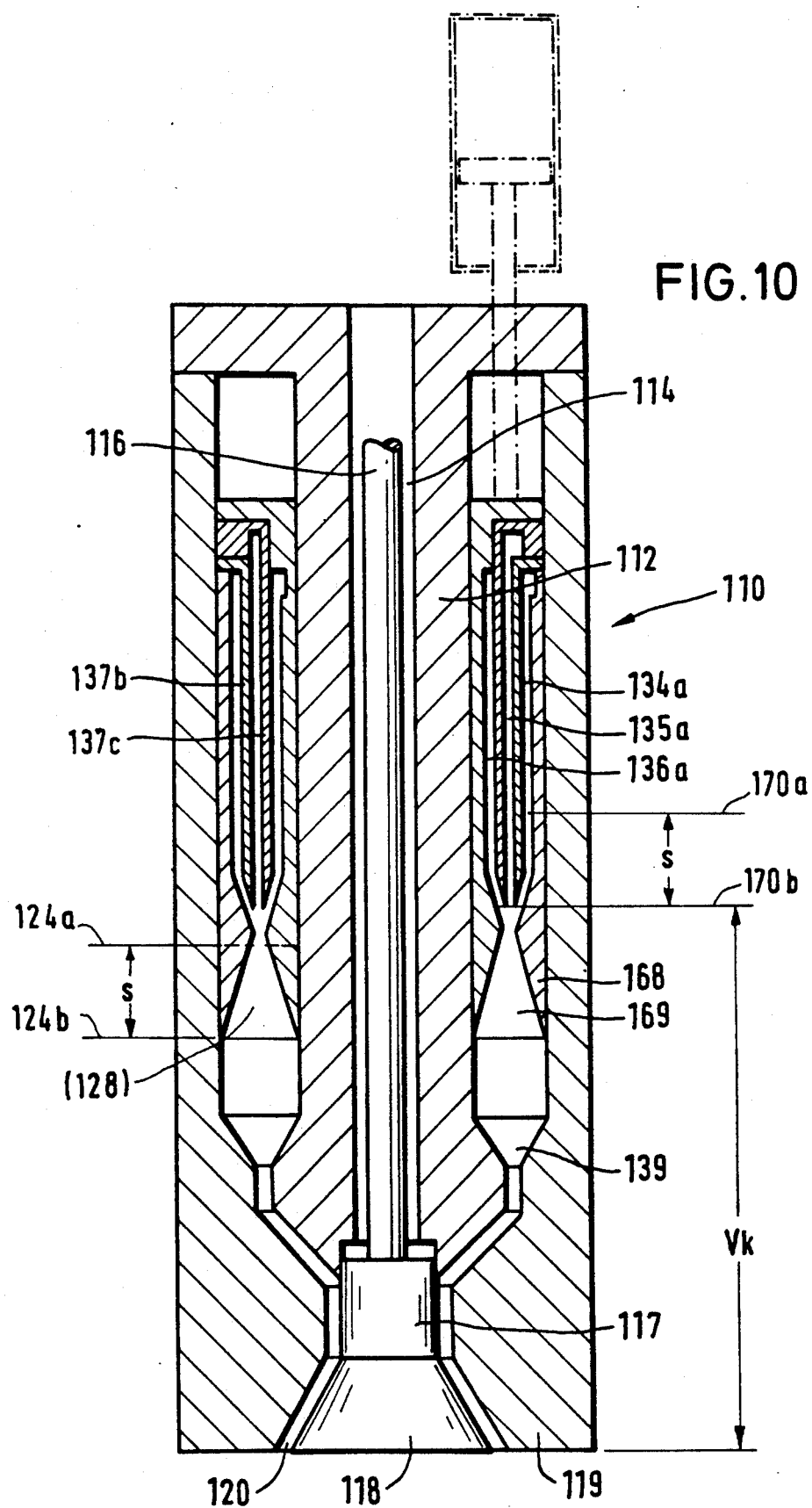
FIG. 10 is a sectional view of a second embodiment of an extrusion head.

FIG. 10 shows a view corresponding to that shown in FIG. 1, of another embodiment of an extrusion head. The components in FIG. 10 which correspond to those of the embodiment shown in FIG. 1 are denoted by the same reference numerals, but increased by 100.

The extrusion head 110 of the embodiment shown in FIG. 10 comprises a housing 111 within which a core 112 is arranged at a spacing from and coaxially with respect to the housing 111. The core 112 is provided with an axial bore 114 which serves to accommodate a rod 116. The rod 116 is movable with a reciprocating movement in the bore 114 in the longitudinal direction of the extrusion head 110 and at its one end carries a guide member 117. Mounted on the guide member 117 is a nozzle core 118 which, jointly with the region 119 of the housing 110 which is disposed around same, delimits an outlet opening 120.

Arranged within the extrusion head 110 is a storage chamber 128 which is coaxial with respect to the core 112 and which is of annular cross-section. An axially reciprocatable annular piston 124 is operatively associated with the storage chamber 128. The extrusion head 110 is also connected to three extruders (not shown) which are communicated in any suitable fashion with duct systems provided within the annular piston 124. The duct systems also have distributor ducts and annular ducts corresponding to those of the extrusion head 10 illustrated in FIG. 1.

The essential difference between the embodiments illustrated in FIGS. 1 and 10 respectively is that, in the construction shown in FIG. 10, the laminate-formation region is within the piston 124 which is provided with an extension portion as indicated at 168, at the end of the piston 124 which is towards the outlet opening 120. The extension portion 168 has an annular duct 169 which is uniformly and progressively increased in width in the direction of flow of the material and through which the laminate formed within the annular piston 124 flows into the storage chamber 128.

The laminate is formed within the annular piston 124 when it issues from the annular ducts 134a, 135a and 136a, that is to say, immediately after passing the lower ends of separating wall portions 137b and 137c which define the annular ducts 134a, 135a and 136a within the annular piston. For the sake of simplicity, it is assumed in relation to the embodiment illustrated in FIG. 10 that the lower ends of the wall portions 137b and 137c define a plane in which the laminate structure is formed from the flows of material issuing from the annular ducts 134a, 135a and 136a. With the reciprocating movements of the annular piston 124 between its first and second limit positions 124a and 124b which define the stroke movement as indicated at s in FIG. 10, the plane in which the laminate structure is formed is moved between the first and second positions 170a and 170b respectively thereof. The volume Vk of the communicating duct 139 which in the FIG. 10 embodiment also includes the annular duct portion 169 within the extrusion portion 168 of the annular piston 124 is thus constituted by the volume of the communicating duct defined in the above-discussed manner between the plane 170b and the outlet opening 120. In other respects the conditions and requirements described hereinbefore in relation to the embodiments shown in FIGS. 1 through 9 correspondingly apply.

Figure 11:
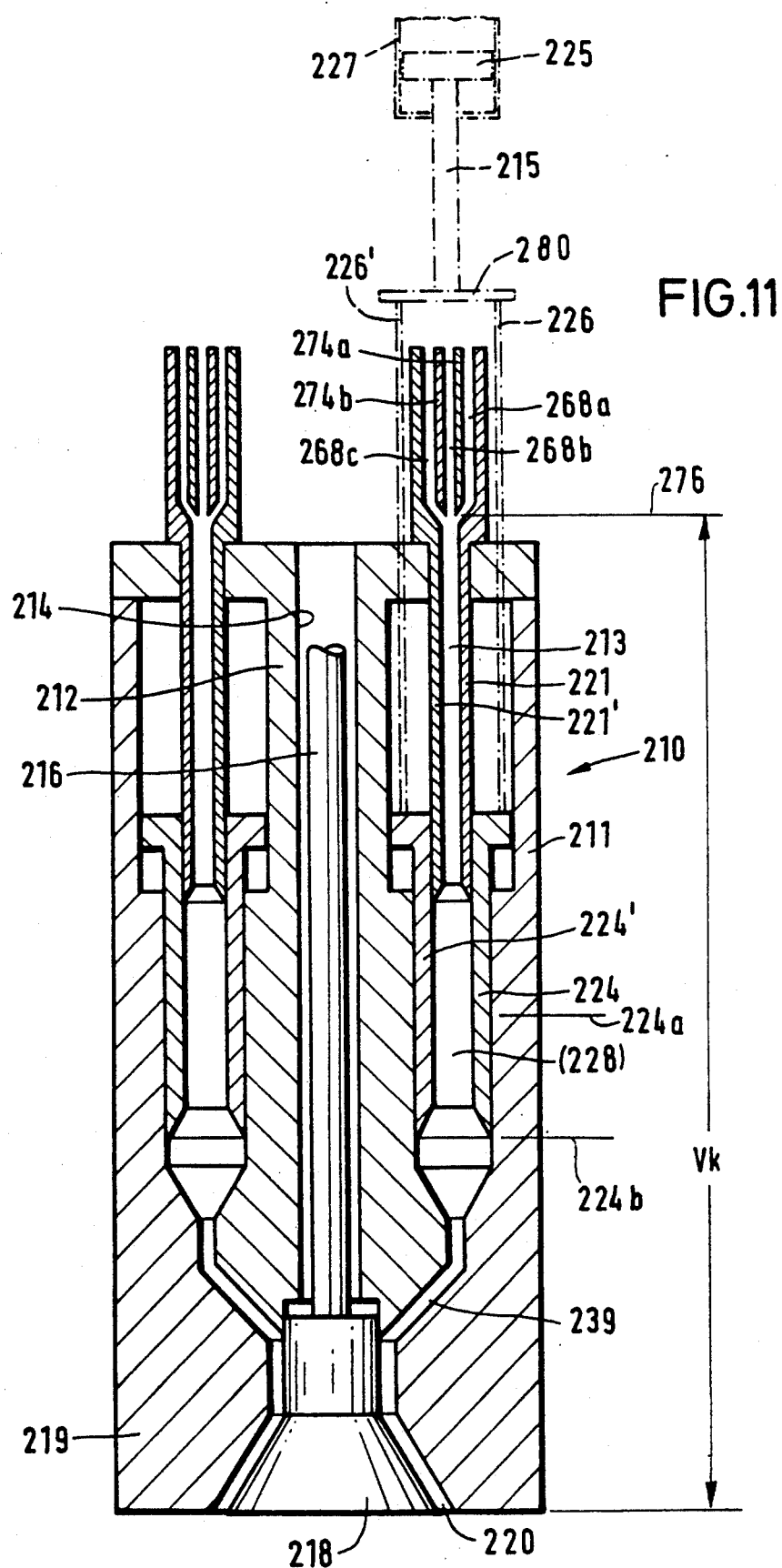
FIG. 11 is a sectional view of a third embodiment of an extrusion head.

Referring now to FIG. 11, the embodiment illustrated therein differs from the other embodiments described hereinbefore in that the laminate-formation region is stationary, instead of being reciprocated with the annular piston in the course of the stroke movements thereof between its first and second limit positions as indicated at 224a and 224b in FIG. 11. In FIG. 11, components corresponding to the extrusion head of the embodiment illustrated in FIGS. 1 through 5 are denoted by the same reference numerals but increased by 200.

Thus, in FIG. 11 the extrusion head 210 has a housing 211, within which a core 212 is arranged at a spacing from and coaxially with respect to the housing. The core 212 has an axial bore 214 which serves to accommodate a rod 216. The rod is reciprocatable in the bore 214 in the longitudinal direction of the extrusion head 210 and at its one end carries a nozzle core 218. The nozzle core 218, together with the region 219 of the housing 211 which is disposed around the nozzle core 218, delimits an outlet opening 220.

Provided within the extrusion head 210 is a storage chamber 228 with which a two-part annular piston unit is operatively associated. The annular piston unit is formed by two mutually coaxially disposed annular pistons 224 and 224' which are disposed at a radial spacing from each other and which are provided with respective piston rods 226 and 226' respectively. The piston rods are connected together by a common transverse member 280. The member 280 is connected by way of further piston rods 215 to a piston 225 which is slidably actuable in a hydraulic cylinder 227. The two annular pistons 224 and 224' thus represent a unit as they are reciprocated jointly between the first and second limit positions 224a and 224b.

The above-described configuration with first and second annular pistons 224 and 224' is necessary in order to allow two annular inserts 221 and 221' which define an annular duct 213 to be arranged coaxially relative to each other between the two annular pistons 224 and 224' in the upper region thereof. The annular duct 213 makes a communication between three mutually coaxially arranged annular ducts 268a, 268b and 268c on the one hand and the storage chamber 228 on the other hand. Plastic material is passed into the annular duct 213 through the annular ducts 268a, 268b and 268c from three extruders (not shown) connected to the extrusion head 210. The three flows of material which are supplied separately through the annular ducts 268a, 268b and 268c which correspond in terms of function to the annular ducts 34a, 35a and 36a in the embodiment shown in FIGS. 1 through 5 combine together at the upper end of the collecting duct 213 to form the laminate structure which then flows through the duct 213 towards the storage chamber 228. The laminate-formation region is disposed in the direction of flow immediately downstream of the free ends of the separating wall portions 274a and 274b which delimit the annular ducts 268a, 268b and 268c in the annular piston unit.

The laminate which flows through the duct 213 towards the outlet opening 220 displaces the annular piston 224 and 224' associated with the storage chamber 228 out of a lower limit position 224b into an upper limit position 224a at the same time as the storage chamber 228 is filled with the laminate material. When the annular pistons 224 and 224' reach the upper limit position 224a thereof, they are urged downwardly into their limit position 224b by suitable actuation of the piston 225 in the cylinder 227, and at the same time the laminate in the storage chamber 228 is urged towards the outlet opening 220.

The volume indicated at Vk between the laminate-formation region which in the embodiment shown in FIG. 11 is assumed to be approximately in the plane 276 which contains the ends of the wall portions 274a and 274b, and the outlet opening 220 is formed in the embodiment shown in FIG. 11 from the volume of the duct 239, the volume of the annular duct 213 and the volume delimited by the two annular pistons 224 and 224' in the lower limit position 224b thereof. In order to produce the effect which the present invention seeks to achieve, the construction shown in FIG. 11 is also required to satisfy the conditions which apply in regard to the volume Vk when the pistons 224 and 224' occupy their lower limit position 224b in which they are towards the outlet opening 220, that is to say, when the storage chamber 228 is emptied by the pistons 224 and 224'. If the volume Vk defined in the above-indicated fashion complies with the previously specified requirements, then the arrangement shown in FIG. 11 also provides that the portion Vv of disturbed laminate is positioned within at least one of the end portions Vb and Vc of the overall portion of material which goes to form a preform, with the result that no portions of the laminate of irregular structure or suffering from other deviations from the desired nature or quality lie in the central portion Va of the laminate structure, from which the article or hollow body 57 is to be produced.

In all the described embodiments, it is possible to adjust the volume Vk by adjustment of the region or range within which the respective annular pistons 24, 124 and 224, 224' perform their stroke movements.

Although reference has only been made hereinbefore to constructions which are operable to produce a laminate structure consisting of three layers, it will be appreciated that the invention is in no way limited thereto but that on the contrary it can also be used in relation to the production of laminates with a difference number of layers.

It will also be appreciated that the above-described embodiments of the process and apparatus according to present invention have been set forth solely by way of example and illustration thereof and that various other modifications and alterations may be made therein without thereby departing from the spirit and scope of the invention.

What is claimed is:

1. A process for producing multilayer hollow bodies by blow molding of multilayer preforms batch extruded through an outlet opening of a single extrusion head, the extrusion head further including a laminate formation region, a communicating duct connecting the laminate formation region and the outlet opening, and a storage chamber located along the communicating duct upstream from the outlet opening and defined by emptying means, the emptying means being movable in a filling stroke movement between second and first limit positions for accumulating material in the storage chamber and in an emptying stroke movement between the first and second limit positions for ejecting material from the storage chamber, each preform having a tubular wall with at least two layers of different thermoplastic materials laminated together, a substantially identical predetermined volume of laminate material being extruded into each preform, comprising the steps of:

moving the emptying means in the filling stroke movement while feeding at least two different thermoplastic materials as separate, mutually adjacent flows through the laminate formation region, the separate flows joining together in the laminate-formation region to form a laminate material entering the communicating duct and accumulating in the storage chamber;

moving the emptying means in the emptying stroke movement to eject one predetermined volume of laminate material into the communicating duct downstream from the storage chamber and to extrude one predetermined volume of the laminate material from the communicating duct through the extrusion head opening as one preform, at least part of the laminate material being formed in the laminate formation region during at least one of a beginning of the emptying stroke movement, an ending of the emptying stroke movement, a beginning of the filling stroke movement and an ending of the filling stroke movement being disturbed in laminate structure, the one extruded preform passing from the outlet opening into a mold cavity of a divided, blow molding mold, the one preform having first and second end portions and a central portion between the end portions, the first end portion preceding the central portion through the extrusion head outlet opening and the second end portion trailing the central portion through the extrusion head outlet opening, at least the central portion of the preform having been held in the communicating duct during at least the prior filling stroke movement; and expanding at least part of the central portion of the one preform within the mold cavity to form a hollow body while squeezing off at least the first and second end portions of the one preform outside the mold cavity as excess flashing, the one preform including laminate material disturbed in laminate structure during at least one of the beginning and ending of one of the emptying stroke and filling stroke movements, and the volume of the communicating duct between the laminate formation region and the outlet opening, with the emptying means in the second limit position, being selected such that laminate material is held in the communicating duct for at least one emptying stroke movement and one subsequent filling stroke movement and is further selected such that the squeezed-off first and second end portions of the one preform contain at least essentially all of the disturbed laminate structure in the one predetermined volume of the laminate material forming the one preform.

2. The process as set forth in claim 1 wherein the laminate material continuously enters the communicating duct from the laminate-formation region during each of the emptying stroke movements and wherein a sum of a volume of the laminate material constituting the first end portion plus a volume of the laminate material constituting the second end portion of the one preform is at least as great as a sum of a volume of the laminate material passing from the laminate-formation region during one of the emptying stroke movements plus a volume of any laminate material with laminate structure disturbed at the beginning of one of the filling stroke movements, and wherein the volume of the communicating duct between the laminate-formation region and the outlet opening when the emptying means is at the second limit position is:

(a) at least as great as a sum of a volume of the laminate material constituting the central portion of the one preform plus a volume of the laminate material constituting the first end portion of the one preform plus a volume of any laminate material passing from the laminate-formation region during one of the emptying stroke movements, and (b) only as great as a sum of one predetermined volume plus a volume of the laminate material constituting the first end portion of the preform less a volume of any laminate material passing from the laminate-formation region with disturbed laminate structure at the beginning of one of the filling stroke movements.

3. The process as set forth in claim 2 wherein the volume of the communicating duct between the laminate formation region and the outlet opening at a time when the emptying means is at the second limit position equals the predetermined volume of the one preform.

4. The process as set forth in claim 1 wherein the volume of the communicating duct between the laminate-formation region and the outlet opening at a time when the emptying means is at the second limit position is:

(a) at least as great as a sum of the predetermined volume plus a volume of the laminate material constituting the central portion of the one preform plus a volume of the laminate material constituting the first end portion of the one preform plus a volume of any laminate material passing from the laminate-formation region during one of the emptying stroke movement, and (b) only as great as a sum of twice the predetermined volume plus a volume of the laminate material constituting the first end portion of one preform less a volume of any laminate material passing from the laminate-formation region with disturbed laminate structure at the beginning of one of the filling stroke movements.

5. The process as set forth in claim 1 wherein the volume of the communicating duct between the laminate-formation region and the outlet opening at a time when the emptying means is at the second limit position is equal to an integral multiple of the predetermined volume plus a volume:

(a) at least as great as a sum of a volume of the laminate material constituting the central portion of the one preform plus a volume of the laminate material constituting the first end portion of the one preform plus a volume of any portion laminate material passing from the laminate-formation region during one of the emptying stroke movements, and (b) only as great as a sum of the predetermined volume plus a volume of the laminate material constituting the first end portion of the one preform less a volume of any laminate material passing from the laminate-formation region with disturbed laminate structure at the beginning of one of the filling stroke movements.

6. The process as set forth in claim 1 wherein each of the first and second end portions of the one preform includes material with disturbed laminate structure.

7. The process as set forth in claim 1 wherein the laminate-formation region is reciprocated within the extrusion head during the filling and emptying stroke movements in accordance with movements of the emptying means.

8. The process as set forth in claim 1 wherein the laminate-formation region is stationary within the extrusion head.

9. The process as set forth in claim 1 wherein only one of the first and second end portions of the one preform contains material of disturbed laminate structure.

10. The process as set forth in claim 1 wherein the volume of the storage chamber is equal to an increase in volume of the communicating duct between the laminate-formation region and the outlet opening from moving the emptying means from the second limit position to the first limit position and wherein the storage chamber volume plus a volume of the laminate material passing through the laminate formation region during the emptying stroke movement equals the predetermined volume.

11. The process as set forth in claim 1 wherein at least one of the first and second limit positions is variable for varying volume of the communicating duct and further comprising the step of adjusting the volume of the communicating duct to position the disturbed portions of the laminate material of each preform in only end portions of each preform.

12. The process as set forth in claim 11 wherein the adjusting step comprises providing at least a portion of the communicating duct connecting the storage chamber and the outlet opening with a volume at least approximately equal to an integral multiple of the predetermined volume.

13. The process as set forth in claim 7 wherein the laminate-formation region is located at an end face of the emptying means, the end face defining an end wall of the storage chamber and wherein each of the moving steps comprises the step of forming the laminate material in the storage chamber.

14. The process as set forth in claim 7 wherein the laminate-formation region is located at an end face of the emptying means, the end face defining an end all of the storage chamber and wherein each of the moving steps comprises the step of forming the laminate material in the storage chamber.

15. A process for producing multilayer hollow bodies from thermoplastic materials by blow molding of multilayer preforms batch extruded in one working cycle through an outlet opening of a single extrusion head, the extrusion head further including a laminate formation region, a communicating duct located between the laminate formation region and the outlet opening, and a storage chamber located upstream from the outlet opening but not upstream of the laminate formation region, the storage chamber being defined by emptying means, the emptying means being movable in a filling stroke movement between second and first limit positions for defining the storage chamber and for accumulating laminate material in the storage chamber and in an emptying stroke movement between the first and second limit positions for ejecting material from the storage chamber, each preform having a tubular wall with layers of different materials laminated together including at least one layer of each of at least two different thermoplastic materials, a substantially identical predetermined volume of laminate material being extruded into each preform, the one preform having first and second end portions and a central portion between the end portions from which central portion the entire hollow body is formed, the first end portion preceding the central portion through the extrusion head outlet opening and the second end portion trailing the central portion through the extrusion head outlet opening, comprising the steps of:

moving the emptying means in the filling stroke movement while feeding the different materials as a plurality of separate, mutually adjacent flows into the laminate formation region, the separate flows joining together in the laminate-formation region forming the laminate material, so as to accumulate laminate material in the storage chamber;

moving the emptying means in the emptying stroke movement to eject one predetermined volume of laminate material into the communicating duct downstream from the storage chamber and to extrude one predetermined volume of laminate material from the communication duct through the outlet opening as one preform, at least part of the laminate material being formed in the laminate formation region during at least one of a beginning of the emptying stroke movement, an ending of the emptying stroke movement, a beginning of the filling stroke movement and a ending of the filling stroke movement, being disturbed in laminate structure, at least the central portion of the one predetermined volume of laminate material ejected into the communicating duct being held in the communicating duct downstream from the storage chamber during at least one of the filling stroke movements; and closing parts of a divided blow molding mold together on the one preform with the central portion of the one preform at least partially located within a mold cavity defined by the closed parts of the mold to form a hollow body and to squeeze off at least the first and second end portions of the one preform outside the mold cavity as flashing, the one preform including laminate material disturbed in laminate structure during at least one of the beginning and ending of one of the emptying stroke and filling stroke movements, and the volume of the communicating duct between the laminate formation region and the outlet opening, with the emptying means in the second limit position, being selected such that the squeezed-off first and/or second end portions of the one preform contain at least essentially all of the laminate structure which was disturbed during the beginning and/or ending of any emptying and/or filling stroke movements.

16. The process as set forth in claim 15 wherein the laminate material continuously passes from the laminate-formation region during each of the emptying stroke movements and wherein a sum of a volume of the laminate material constituting the first end portion of the one preform plus a volume of the laminate material constituting the second end portion of the one preform is at least as great as a sum of a volume of the laminate material passing form the laminate-formation region during one of the emptying stroke movements plus a volume of any laminate material with laminate structure disturbed at the beginning of one of the filling stroke movements, and wherein the volume of the communicating duct between the laminate-formation region and the outlet oepnign when the emptying means is at the second limit position is:
  (a) at least as great as a sum of a volume of the laminate material constituting the central portion of the one preform plus the volume of the laminate material constituting the first end portion of the one preform plus the volume of laminate material passing from the laminate-formation region during one of the emptying stroke movements, and
  (b) not greater than a sum of one predetermined volume plus the volume of the laminate material constituting the first end portion of the one preform less the volume of any laminate material passing from the laminate-formation region with laminate structure disturbed at the beginning of one of the filling stroke movements.

17. The process as set forth in claim 15 wherein the volume of the communicating duct between the laminate-formation region and the outlet opening at a time when the emptying means is at the second limit position is:
  (a) at least as great as a sum of the predetermined volume plus a volume of the laminate material constituting the central portion of the one preform plus a volume of the laminate material constituting the first end portion of the one preform plus a volume of any laminate material passing from the laminate-formation region during one of the emptying stroke movements, and
  (b) not greater than a sum of twice the predetermined volume plus a volume of the laminate material constituting the first end portion of one preform less a volume of any laminate material passing from the laminate-formation region with disturbed laminate structure at the beginning of one of the filling stroke movements.

18. The process as set forth in claim 15 wherein the volume of the communicating duct between the laminate-formation region and the outlet opening at a time when the emptying means is at the second limit position is equal to an integral multiple of the predetermined volume plus a volume:
  (a) at least as great as a sum of a volume of the laminate material constituting the central portion of the one preform plus a volume of the laminate material constituting the first end portion of the one preform plus a volume of any portion laminate material passing from the laminate-formation region during one of the emptying stroke movements, and
  (b) not greater than a sum of the predetermined volume plus a volume of the laminate material constituting the first end portion of the one preform less a volume of any laminate material passing from the laminate-formation region with disturbed laminate structure at the beginning of one of the filling stroke movements.

19. The process as set forth in claim 15 wherein each of the first and second end portions of the one preform includes material with disturbed laminate structure.

20. The process as set forth in claim 15 wherein only one of the first and second end portions of the one preform contains material of disturbed laminate structure.

21. The process as set forth in claim 15 wherein the storage chamber volume plus a volume of the laminate material passing through the laminate formation region during the emptying stroke movement equals the predetermined volume.

22. The process as set forth in claim 15 wherein at least one of the communication duct, the first limit position and the second limit position is variable for varying volume of the communicating duct and further comprising the step of adjusting the volume of the communicating duct to position the disturbed portions of the laminate material of each preform in only end portions of each preform.

23. The process as set forth in claim 22 wherein the adjusting step comprises providing at least a portion of the communicating duct connecting the storage chamber and the outlet opening with a volume at least approximately equal to an integral multiple of the predetermined volume.

24. A process for producing multilayer hollow bodies by blow molding of preforms, each preform including a tubular wall of laminate material comprising at least two layers of different thermoplastic materials, each preform being extruded through a single outlet opening from a substantially identical predetermined volume of the laminate material, each preform having first and second end portions and a central portion between the end portions form which central portion the entire hollow body is formed, the first end portion preceding the central portion through said opening and the second end portion trailing the central portion through said opening, comprising the steps of:
  directing separate flows of each component of the laminate material, including each of at least two different thermoplastic materials, to a laminate-formation region, the separate flows joining together as mutually adjacent flows in the laminate formation region to form a laminate structure of the components;
  providing a zone in the flow path between the laminate formation region and the outlet opening to receive the laminate material from the laminate formation region;
  accumulating the laminate material at a storage area along the flow path between the laminate-formation region and the outlet opening, upstream from the outlet opening but not upstream of the laminate formation region;
  ejecting laminate materials from the storage area into a portion of the zone downstream along the flow path from the storage area, a total of one predetermined volume of the laminate material entering the downstream portion of the zone during the ejecting step;
  holding at least said central portion of the ejected laminate material having an undisturbed laminate structure in the downstream portion of the zone during at least one accumulating step, the laminate structure of at least some of the ejected laminate material having been disturbed during at least one of a beginning and ending of at least one of the accumulating step and the ejecting step;
  extruding one predetermined volume of the laminate material including at least said central portion through the outlet opening as one preform during a subsequent ejecting step; and surrounding at least part of the central portion of the one preform with a blow mold cavity to form a hollow body while squeezing off at least the first and second end portions of the one preform outside the mold cavity as flashing, the first and/or second end portions containing essentially all of the one predetermined volume of the laminate material forming the one preform which is disturbed during the beginning and/or ending of any accumulating and/or ejecting step.

25. The process as set forth in claim 24 wherein the laminate material continuously passes from the laminate-formation region during each ejecting step and wherein a sum of a volume of the laminate material constituting the first end portion of each preform plus a volume of the laminate material constituting the second end portion of each preform is at least as great as a sum of a volume of the laminate material passing form the laminate-formation region during each ejecting step plus a volume of any laminate material passing from the laminate-formation region with disturbed laminate structure at the beginning of each accumulating step, and wherein the volume of the zone between the laminate-formation region and the outlet opening at the end of each ejecting step is:

(a) at least as great as a sum of a volume of the laminate material constituting the central portion of each preform plus the volume of the laminate material constituting the first end portion of each preform plus the volume of laminate material passing from the laminate-formation region during each ejecting step, and (b) not greater than a sum of one predetermined volume plus the volume of the laminate material constituting the first end portion of each preform less the volume of any laminate material passing from the laminate-formation region with disturbed laminate structure at the beginning of the accumulating step.

26. The process as set forth in claim 24 wherein the volume of the zone between the laminate-formation region and the outlet opening at the end of the ejecting step is:

(a) at least as great as a sum of the predetermined volume plus a volume of the laminate material constituting the central portion of each preform plus a volume of the laminate material constituting the first end portion of each preform plus a volume of any laminate material passing form the laminate-formation region during the ejecting step; and (b) not greater than a sum of twice the predetermined volume plus the volume of the laminate material constituting the first end portion of each preform less a volume of any laminate material passing from the laminate-formation region with disturbed laminate structure at the beginning of the accumulating step.

27. The process as set forth in claim 24 wherein the volume of the communicating duct between the laminate-formation region and the outlet opening at the end of the ejecting step is equal to an integral multiple of the predetermined volume plus a volume:

(a) at least as great as a sum of a volume of the laminate material constituting the central portion of each preform plus a volume of the laminate material constituting the first end portion of each preform plus a volume of any portion laminate material passing from the laminate-formation region during the ejecting step, and (b) not greater than a sum of the predetermined volume plus the volume of the laminate material constituting the first end portion of each preform less a volume of any laminate material passing from the laminate-formation region with disturbed laminate structure at the beginning of the accumulating step.

28. The process as set forth in claim 24 wherein the laminate-formation region is reciprocated during the accumulating and ejecting steps.

29. The process as set forth in claim 28 wherein the laminate-formation region defines one end of the storage area, and wherein the accumulating step further comprises the step forming the laminate material directly in the storage area.

30. The process as set forth in claim 24 where each of the first and second end portions of the one preform includes material with disturbed laminate structure.

31. The process as set forth in claim 24 where only one of the first and second end portions of the one preform contains material of disturbed laminate structure.

32. The process as set forth in claim 24 wherein the storage area volume plus a volume of the laminate material passing through the laminate formation region during the ejecting step equals the predetermined volume.

33. The process as set forth in claim 24 further comprising the step of adjusting the volume of the zone to position the disturbed portions of the laminate materials of each preform in only end portions of each preform.

34. The process as set forth in claim 33 wherein the adjusting step comprises providing at least a portion of the zone connecting the storage chamber and the outlet opening with a volume at least approximately equal to an integral multiple of the predetermined volume.

* * * * *